United States Patent
Chen et al.

(10) Patent No.: US 11,069,891 B2
(45) Date of Patent: Jul. 20, 2021

(54) BATTERY, BATTERY PACK AND CONTINUOUS POWER SUPPLY

(71) Applicants: Positec Power Tools (Suzhou) Co., Ltd., Suzhou (CN); Pu Chen, Waterloo (CA)

(72) Inventors: Pu Chen, Waterloo (CA); Xiaosong Luo, Suzhou (CN); Yang Liu, Waterloo (CA); Xinyong Liu, Suzhou (CN); Xiao Zhu, Waterloo (CA)

(73) Assignees: POSITEC POWER TOOLS (SUZHOU) CO., LTD., Suzhou (CN); Pu Chen, Waterloo (CA)

( * ) Notice: Subject to any disclaimer, the term of this patent is extended or adjusted under 35 U.S.C. 154(b) by 0 days.

(21) Appl. No.: 15/513,640

(22) PCT Filed: Sep. 25, 2015

(86) PCT No.: PCT/CN2015/090769
§ 371 (c)(1),
(2) Date: Mar. 23, 2017

(87) PCT Pub. No.: WO2016/045622
PCT Pub. Date: Mar. 31, 2016

(65) Prior Publication Data
US 2017/0309912 A1 Oct. 26, 2017

(30) Foreign Application Priority Data

Sep. 26, 2014 (CN) .......................... 201410502555.6
Dec. 30, 2014 (CN) .......................... 201410840210.1
Dec. 30, 2014 (CN) .......................... 201410841197.1

(51) Int. Cl.
*H01M 10/0525* (2010.01)
*H01M 10/0567* (2010.01)
*H01M 4/133* (2010.01)
*H01M 4/134* (2010.01)
*H01M 4/62* (2006.01)
*H01M 4/66* (2006.01)
*H01M 10/36* (2010.01)
*H01M 4/38* (2006.01)
*H01M 4/587* (2010.01)
*H01M 50/20* (2021.01)

(52) U.S. Cl.
CPC .......... *H01M 4/587* (2013.01); *H01M 4/133* (2013.01); *H01M 4/134* (2013.01); *H01M 4/381* (2013.01); *H01M 4/622* (2013.01); *H01M 4/66* (2013.01); *H01M 4/663* (2013.01); *H01M 4/666* (2013.01); *H01M 4/667* (2013.01); *H01M 4/668* (2013.01); *H01M 10/0525* (2013.01); *H01M 10/0567* (2013.01); *H01M 10/36* (2013.01); *H01M 50/20* (2021.01); *H01M 2220/20* (2013.01)

(58) Field of Classification Search
CPC ...... H01M 4/587; H01M 4/381; H01M 4/663; H01M 4/668; H01M 2/1072; H01M 4/133; H01M 4/134; H01M 10/0567; H01M 10/0525; H01M 4/622; H01M 4/666; H01M 4/667; H01M 4/66; H01M 10/36; H01M 2220/20
See application file for complete search history.

(56) References Cited

U.S. PATENT DOCUMENTS

| | | | |
|---|---|---|---|
| 4,492,021 A * | 1/1985 | Wright ................. | H01M 4/661 228/235.1 |
| 5,721,068 A * | 2/1998 | West ...................... | H01M 4/12 29/623.1 |
| 8,703,330 B2 | 4/2014 | Phillips et al. | |
| 9,680,154 B2 | 6/2017 | Chen et al. | |
| 2003/0099882 A1 | 5/2003 | Hampden-Smith et al. | |
| 2003/0215716 A1* | 11/2003 | Suzuki ................. | H01M 4/0404 429/232 |
| 2006/0063065 A1 | 3/2006 | Clarke et al. | |
| 2006/0088759 A1 | 4/2006 | Roh | |
| 2007/0037060 A1 | 2/2007 | Lee et al. | |

(Continued)

FOREIGN PATENT DOCUMENTS

| | | |
|---|---|---|
| CN | 1770515 A | 5/2006 |
| CN | 101465421 A | 10/2009 |

(Continued)

OTHER PUBLICATIONS

Supplementary European Search Report for European Patent Application No. EP 15 84 3519, dated Feb. 20, 2018; 8 pages.

(Continued)

*Primary Examiner* — Muhammad S Siddiquee
(74) *Attorney, Agent, or Firm* — Howard & Howard Attorneys PLLC

(57) ABSTRACT

A battery has a cathode, an anode and an electrolyte, with the cathode having a cathode current collector and a cathode material. The cathode material has a cathode active material, which is capable of reversibly intercalating and deintercalating first metal ions. The electrolyte has a solvent capable of dissolving the first metal ions and second metal ions that can be reduced to a metal during a charge cycle and be oxidized from the metal to the dissolved second metal ions during a discharge cycle. The cathode current collector has an electrochemically inert carrier and graphite. The carrier is wrapped by the graphite. The cathode current collector provided has good corrosion resistance and the battery has a long floating charge life and a low cost.

18 Claims, 6 Drawing Sheets

(56) References Cited

U.S. PATENT DOCUMENTS

| | | | |
|---|---|---|---|
| 2008/0163478 A1* | 7/2008 | Phillips | H01M 10/0431 29/623.5 |
| 2009/0057940 A1* | 3/2009 | Zhamu | C04B 35/522 264/49 |
| 2009/0123850 A1 | 5/2009 | Takeuchi et al. | |
| 2009/0220860 A1 | 9/2009 | Xi et al. | |
| 2010/0062338 A1 | 3/2010 | Golightly et al. | |
| 2010/0266895 A1* | 10/2010 | Tucholski | H01M 2/08 429/185 |
| 2010/0304274 A1* | 12/2010 | Bennett | H01M 4/8605 429/499 |
| 2011/0159381 A1 | 6/2011 | Doe et al. | |
| 2011/0171534 A1 | 7/2011 | Lampert et al. | |
| 2011/0223470 A1 | 9/2011 | Tomantschger | |
| 2013/0089769 A1 | 4/2013 | Proctor et al. | |
| 2013/0171523 A1 | 7/2013 | Chen et al. | |
| 2014/0272480 A1* | 9/2014 | Schuetzbach | H01B 1/16 429/50 |
| 2014/0272605 A1* | 9/2014 | Lim | H01M 10/052 429/331 |
| 2015/0311516 A1* | 10/2015 | Chen | H01M 4/134 429/220 |
| 2016/0056417 A1* | 2/2016 | Flitsch | B29D 11/00817 429/185 |

FOREIGN PATENT DOCUMENTS

| | | | |
|---|---|---|---|
| CN | 102035007 A | 4/2011 | |
| CN | 102110839 A | 6/2011 | |
| CN | 101208818 A | 11/2012 | |
| CN | 102856557 A | 1/2013 | |
| CN | 103022472 A | 4/2013 | |
| CN | 103030171 A | 4/2013 | |
| CN | 103531769 A | 1/2014 | |
| CN | 103682476 A | 3/2014 | |
| CN | 102856557 B | 10/2014 | |
| CN | 103107373 A | 9/2015 | |
| EP | 2717377 A1 | 4/2014 | |
| NO | 2010048181 A2 | 4/2010 | |
| NO | 2010048181 A3 | 7/2010 | |
| WO | 2006116496 A2 | 11/2006 | |
| WO | 2012163300 A1 | 12/2012 | |

OTHER PUBLICATIONS

English language abstract and computer-generated English language translation for CN102035007 extracted from espacenet.com database on Jan. 31, 2016; 11 pages.

English language abstract and computer-generated English translation for CN 102110839 extracted from espacenet.com database on Jan. 31, 2016, 18 pages.

English language abstract for CN101208818 extracted from espacenet.com database on Jan. 31, 2016; 2 pages.

English language abstract and computer-generated English language translation for CN102856557 extracted from espacenet.com database on Jan. 31, 2016, 15 pages.

English language abstract and computer-generated English language translation for CN103107373 extracted from espacenet.com database on Jan. 31, 2016; 25 pages.

International Search Report for International Patent Application No. PCT/CN2014/081029, dated Sep. 2, 2014; 4 pages.

English language abstract and computer-generated translation of CN103682476 extracted from espacenet.com database Mar. 21, 2017, 33 pages.

English language abstract and computer-generated translation of CN101465421 extracted from espacenet.com database Mar. 21, 2017, 9 pages.

English language abstract and computer-generated translation of CN103030171 extracted from espacenet.com database Mar. 21, 2017, 6 pages.

English language abstract and computer-generated translation of CN103022472 extracted from espacenet.com database Mar. 21, 2017, 8 pages.

English language abstract and computer-generated translation of CN103531769 extracted from espacenet.com database Mar. 21, 2017, 4 pages.

English language translation of the International Search Report for PCT/CN2015/090769, dated Dec. 9, 2015.

English language abstract only of International Patent Application Publication No. WO 2012/163300 extracted from www.espacenet.com on Mar. 5, 2019; see English language equivalent U.S. Pat. No. 9,680,154 B2; 2 pages.

English language abstract, and machine-assisted English language translation of Chinese Patent Publication No. CN 102856557 A extracted from www.espacenet.com on Mar. 5, 2019; 9 pages.

English language abstract and computer-generated translation of CN1770515A extracted from espacenet.com Feb. 27, 2019, 8 pages.

\* cited by examiner

BATTERY, BATTERY PACK AND CONTINUOUS POWER SUPPLY

CROSS-REFERENCES TO RELATED APPLICATIONS

This application is the U.S. National Stage of International Patent Application No. PCT/CN2015/090769, filed Sep. 25, 2015, the content of which is incorporated herein by reference.

FIELD OF THE INVENTION

The present invention relates to an electrochemical energy storage technology. In particular, the invention relates to a battery. The invention also relate to a battery pack and an uninterrupted power supply.

BACKGROUND OF THE INVENTION

Lead-acid batteries, which exist over hundred years and have a mature technology, have accumulated dominant market share in car starting batteries, electric bicycles, UPS and other energy storage areas. Although the cycle life and the energy density are relatively low, lead-acid batteries characterize high cost effectiveness. Thus, in recent years lead-acid batteries cannot be replaced by nickel-metal hydride batteries, lithium ion batteries and sodium sulfur batteries in energy storage area.

A new aqueous battery comprises a cathode, an anode and en electrolyte, the working principle could be summarized as follows: during the charging process, a first metal ions deintercalate from the cathode, while simultaneously, a second metal ions in the electrolyte are reduced and deposited onto the surface of the anode. The electrolyte comprises the first metal ions and the second metal ions. Theoretical energy density of the battery is 160 Wh/Kg, and the actual energy density is expected to reach 50-80 Wh/Kg. Therefore this type of battery could be a promising alternative of lead-acid batteries in next generation storage batteries.

However, the float charge life of the battery does not satisfy the requirement of commercial application, which should be further improved.

SUMMARY OF THE INVENTION

According to the present invention, there is provided a battery which has an improved float charge life.

The invention provides a battery comprising a cathode, an anode and an electrolyte, the cathode comprising a cathode current collector and a cathode material, and the cathode material comprising a cathode active material which is capable of reversibly intercalating and deintercalating a first metal ions; the electrolyte comprising a solvent capable of dissolving the first metal ions and a second metal ions that can be reduced to a metal during a charge cycle and be oxidized from the metal to the dissolved second metal ions during a discharge cycle; the cathode current collector comprising an electrochemically inert carrier and a graphite, the carrier being coated by the graphite.

Preferably the material of the carrier is selected from one of polyethylene terephthalate, polybutylene terephthalate, polyethylene, polypropylene, polyamide, polyurethane and polyacrylonitrile.

Preferably the carrier is provided with a porous structure and the pore size range of the carrier is between 50 meshes and 200 meshes.

Preferably the thickness of the carrier is less than 1 mm.

Preferably the thickness range of the graphite is between 0.1 mm and 0.2 mm.

Preferably the content of carbon in the graphite is greater than 97 percent.

Preferably the battery further comprises a bismuth compound as an additive, the bismuth compound is added in the anode and/or the electrolyte.

Preferably the bismuth compound is selected from bismuth trioxide and/or bismuth nitrate.

Preferably the battery further comprises a separator.

Preferably the weight proportion range of the bismuth compound in the electrolyte is between 0.01 percent and 5 percent.

Preferably the weight proportion range of the bismuth compound in the anode is between 0.1 percent and 10 percent.

Preferably pH range of the electrolyte is 3 to 7.

Preferably the solvent is an aqueous solution or alcohol solution.

Preferably the anions of the electrolyte comprise at least one of sulfate ions, chloride ions, acetate ions, formate ions, phosphate ions or alkyl sulfonate ions.

Preferably the first metal ions are selected from lithium ions, sodium ions, magnesium ions or zinc ions.

Preferably the second metal ions are selected from manganese ions, iron ions, copper ions, zinc ions, chromium ions, nickel ions, tin ions or lead ions.

Preferably the cathode active material is selected from at least one of $LiMn_2O_4$, $LiFePO_4$ or $LiCoO_2$.

Preferably the cathode active material is configured to the cathode current collector by means of slurry or coating.

Preferably the anode comprises a brass foil and a zinc foil.

Preferably the cathode material further comprises a cathode conductive agent, the cathode conductive agent accounts for 1 to 15 percent by mass of the cathode material.

Preferably the cathode material further comprises a cathode conductive agent, the cathode conductive agent accounts for 10 to 14 percent by mass of the cathode material.

Preferably the cathode material also comprises a composite conductive agent comprising carbon nanotubes and acetylene black, the mass ratio of the composite conductive agent to the cathode active material is 0.005 to 0.3, and the mass ratio of the carbon nanotubes to the acetylene black is 0.25 to 1.25.

Preferably the mass ratio of the composite conductive agent to the cathode active material is 0.1 to 0.3, and the mass ratio of the carbon nanotubes to the acetylene black is 0.3 to 1.

Preferably the composite conductive agent is provided with a three-dimensional network-like structure.

Preferably the length range of the carbon nanotubes is between 50 μm and 200 μm, and the diameter range is between 5 nm and 30 nm.

Preferably the particle size range of the acetylene black is between 10 nm and 50 nm.

Preferably the cathode comprises a cathode plate and a binding layer arranged between the cathode plate and the cathode current collector, the cathode plate comprises the cathode active material, and the binding layer comprises a binder and a conductive agent.

Preferably the weight range of the binding layer per ampere hour is between 0.5 g and 1 g.

Preferably the weight proportion range of the binder in the binding layer is between 1 percent and 70 percent, and the weight proportion range of the conductive agent in the binding layer is between 30 percent and 99 percent.

Preferably the material of the binder is selected from polytetrafluoroethylene, polyvinylidene fluoride, acrylonitrile multipolymer, hydroxypropyl methyl cellulose, polyethylene oxide, polyacrylamide or a mixture of sodium carboxymethylcellulose and styrene-butadiene rubber.

Preferably the material of the conductive agent is selected from at least one of graphite, carbon nanotubes, graphene, carbon black and carbon fiber.

The invention also provides a battery pack comprising a plurality of batteries provided by the present invention.

The invention also provides an uninterrupted power supply comprising the battery provided by the present invention.

Compared with the prior art, the cathode of the battery provided in the present invention comprises a composite graphite current collector, on one hand, the weight and cost of the battery are reduced, and more importantly, the float-charging life of the battery is prolonged. In addition, slurry coating on the composite graphite current collector can be adopted directly to prepare the cathode, and thereby the battery preparation process is simplified.

The present invention also provides a cathode which can solve the corrosion problem of a cathode conductive agent.

The invention provides a cathode comprising a cathode plate, a cathode current collector and a binding layer arranged between the cathode plate and the cathode current collector, the cathode plate comprising a cathode active material which is capable of reversibly intercalating and deintercalating a first metal ions, and the binding layer comprising a binder and a conductive agent.

Preferably the weight range of the binding layer per ampere hour is between 0.5 g and 1 g.

Preferably the weight proportion range of the binder in the binding layer is between 1 percent and 70 percent, and the weight proportion range of the conductive agent in the binding layer is between 30 percent and 99 percent.

Preferably the material of the binder is chosen from polytetrafluoroethylene, polyvinylidene fluoride, acrylonitrile multipolymer, hydroxypropyl methyl cellulose, polyethylene oxide, polyacrylamide or a mixture of sodium carboxymethylcellulose and styrene-butadiene rubber.

Preferably the material of the conductive agent is chosen from at least one of graphite, carbon nanotubes, graphene, carbon black and carbon fiber.

The present invention also provides a battery which can solve the corrosion problem of a cathode conductive agent and the self-discharge problem of battery.

The invention provides a battery comprising a cathode, an anode and an electrolyte, the electrolyte comprising a solvent capable of dissolving the first metal ions and a second metal ions that can be reduced to a metal during a charge cycle and be oxidized from the metal to the dissolved second metal ions during a discharge cycle; the cathode being provides as above.

Preferably the cathode current collector comprising an electrochemically inert carrier and graphite coating on the carrier.

Preferably the material of the carrier is chosen from one of polyethylene terephthalate, polybutylene terephthalate, polyethylene, polypropylene, polyamide, polyurethane and polyacrylonitrile.

Preferably the battery further comprises a bismuth compound as an additive; the bismuth compound is added in the anode and/or the electrolyte.

Preferably the bismuth compound is chosen from bismuth trioxide and/or bismuth nitrate.

Preferably the battery further comprises a separator.

Preferably pH range of the electrolyte is 3 to 7.

Preferably the solvent is an aqueous solution or alcohol solution.

Preferably the anions of the electrolyte comprise at least one of sulfate ions, chloride ions, acetate ions, formate ions, phosphate ions or alkyl sulfonate ions.

Preferably the first metal ions are selected from Li ions, Na ions, Mg ions or Zn ions.

Preferably the second metal ions are selected from manganese ions, iron ions, copper ions, zinc ions, chromium ions, nickel ions, tin ions or lead ions.

Preferably the cathode active material is selected from at least one of $LiMn_2O_4$, $LiFePO_4$ or $LiCoO_2$.

Preferably the anode comprises a brass foil and a zinc foil.

Compared with the prior art, the cathode of the battery provided in the present invention comprises a binding layer which can solve the problem of battery self-discharge and improve the float-charging life. Meanwhile the preparation technology of the battery is simple and the consistency of the battery performance has been much improved.

The present invention also provides a battery which can improve the conductivity of a cathode material, inhibit the battery self-discharge and improve the electrochemical performance of the battery.

The invention provides a battery comprising a cathode, an anode and an electrolyte, the cathode comprising a cathode active material which is capable of reversibly intercalating and deintercalating a first metal ions; the electrolyte comprising the first metal ions and a second metal ions, the first metal ions deintercalating from the cathode active material during the charge cycle and intercalating into the cathode active material during the discharge cycle; the second metal ions being reduced to a metal during a charge cycle and being oxidized from the metal to the dissolved second metal ions during a discharge cycle; the cathode material further comprising a composite conductive agent comprising carbon nanotubes and acetylene black, the mass ratio of the composite conductive agent to the cathode active material is 0.005 to 0.3, and the mass ratio of the carbon nanotubes to the acetylene black is 0.25 to 1.25.

Preferably the mass ratio of the composite conductive agent to the cathode active material is 0.1 to 0.3, and the mass ratio of the carbon nanotubes to the acetylene black is 0.3 to 1.

Preferably the composite conductive agent is provided with a three-dimensional network-like structure.

Preferably the length range of the carbon nanotubes is between 50 μm and 200 μm, and the diameter range is between 5 nm and 30 nm.

Preferably the particle size range of the acetylene black is between 10 nm and 50 nm.

Preferably the cathode active material is selected from at least one of $LiMn_2O_4$, $LiFePO_4$ or $LiCoO_2$.

Preferably the first metal ions are selected from Li ions, Na ions or Mg ions.

Preferably the second metal ions are Zinc ions.

Preferably the anions of the electrolyte comprise at least one of sulfate ions, chloride ions, acetate ions, formate ions, phosphate ions or alkyl sulfonate ions.

Preferably pH range of the electrolyte is 3 to 7.

Compared with the prior art, the present invention has the following beneficial effects: because the present invention adopts a composite conductive agent containing carbon nanotubes and an acetylene black, the cathode active material can be dispersed into a three-dimensional conductive network, so that the conductive contact between active material particles and between conductive agent particles and the active material particles is increased, and thereby the electrical conductivity of the cathode is increased; and moreover, the composite conductive agent has good stability and oxidation resistance, consequently, the self-discharge of the battery is inhibited, and rate capability, specific capacity and cycling stability are all increased effectively.

BRIEF DESCRIPTION OF THE DRAWINGS

The present invention is further described hereinafter in reference to drawings and embodiments.

DETAILED DESCRIPTION OF THE INVENTION

Figure 1:
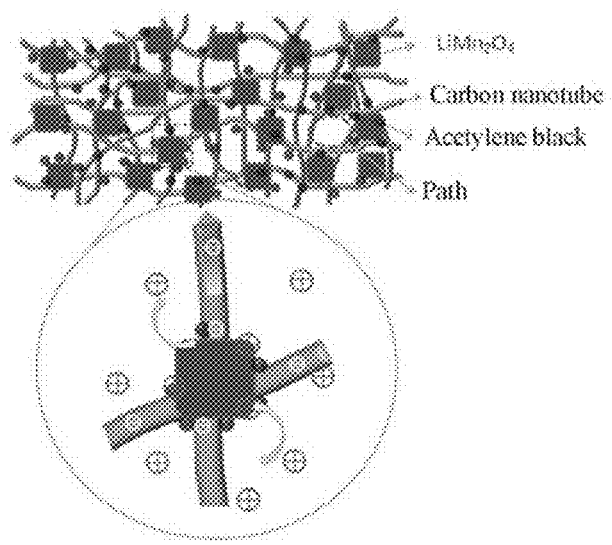
FIG. 1 is a structural schematic diagram of a cathode material provided by embodiment 3-1.

The following description of the preferred embodiment(s) is merely exemplary in nature and is in no way intended to limit the invention, its application or uses.

Embodiment 1

A battery comprises a cathode, an anode and an electrolyte. The cathode comprises a cathode current collector and a cathode material, and the cathode material comprises a cathode active material which is capable of reversibly intercalating and deintercalating a first metal ions. The electrolyte comprises a solvent capable of dissolving the first metal ions and a second metal ions that can be reduced to a metal during a charge cycle and be oxidized from the metal to the dissolved second metal ions during a discharge cycle. The cathode current collector comprises an electrochemically inert carrier and agraphite, the carrier is wrapped by the graphite.

The working principle of the battery could be summarized as follows: during a charge cycle, the first metal ions in the cathode active material deintercalate into the electrolyte, while, the second metal ions in the electrolyte are simultaneously reduced and deposited onto the anode as a second metal. During a discharge cycle, the second metal is oxidized to the second metal ions and dissolved in the electrolyte, the first metal ions in the electrolyte intercalate into the cathode active material.

The cathode of the battery is described and explained in detail hereinafter.

The present invention provides a cathode current collector which comprises a carrier and graphite wrapping the carrier. The carrier itself is electrochemically inactive, and according to the common knowledge of those skilled in the art, electrochemical inactivity means that the carrier does not participate in any electrochemical reactions. The carrier mainly plays the role of bearing the graphite, thus increasing the mechanical property of the graphite, and the graphite mainly plays the role of collecting and conducting electrons.

In order to ensure that the cathode has high energy density, the thickness of the cathode current collector has to be chosen properly. Preferably, the thickness range of the graphite is between 0.1 mm and 0.2 mm; the thickness of the carrier is less than 1 mm, and preferably the thickness range of the carrier is between 0.1 mm and 0.2 mm.

Preferably the content of carbon in the graphite is greater than 97 percent, so the affection of impurities in the graphite on the performance of the battery is prevented.

Preferably the morphology of the graphite is a graphite foil. In general, the graphite foil is a flexible, light and thin paper-like graphite which is produced from graphite powder by a series of processing and press-rolling. Preferably, the density of the graphite foil is greater than 1.0 $g/cm^3$, the higher the density of the graphite foil is, the denser its structure is, consequently, it can be ensured that the surface of the graphite foil in an aqueous battery cannot easily blister, and the properties are stable.

In the prior art, because of high temperature resistance, high heat conductivity and easiness in use, the graphite foil is often used as a heat conduction material for electronic products and a sealing material for industries such as instruments and machinery. In the present invention the graphite foil is used as the cathode current collector, the weight of the cathode is reduced, moreover, because the stability of the graphite foil in aqueous electrolyte solution is good, the battery has a longer float-charging life, furthermore, the cost of the battery is reduced, and thereby the battery has a commercial application prospect.

The material of the carrier may be selected from one of polyethylene terephthalate (PET), polybutylene terephthalate (PBT), polyethylene (PE), polypropylene (PP), polyamide (PA), polyurethane (PU) and polyacrylonitrile (PAN). These materials are stable in the cathode plate and do not participate in the electrochemical reaction, thus the battery has a high energy density output and low weight. Preferably the carrier is nylon net, i.e. polyamide.

In another embodiment of the carrier, the carrier is a double-sided adhesive tape, and two graphite foils wrap the two surfaces of the double-sided adhesive tape by bonding.

Preferably, the carrier has a porous structure, and specifically, the pore size range of the carrier is between 50 meshes and 200 meshes. The porous carrier helps the graphite foils to be attached on the carrier, and increases the stripping resistance of the graphite foils and the carrier, and thereby the stable operation of the cathode current collector is guaranteed.

Preferably the graphite foil is wrapped on the carrier by means of hot pressing, rolling or gluing.

Hot pressing is to heat a polymer contained in the carrier under temperature which is higher than the glass transition temperature of the polymer, along with a certain pressure to make the binding closely between the graphite foil and the carrier. In one embodiment of hot pressing a carrier which is cut to a predetermined size is placed in two pieces of graphite foil, hot under a certain pressure then the graphite foils and the carrier are bonded together.

In an embodiment of rolling, a nylon net which is cut to a predetermined size is placed in two pieces of graphite foil, cold rolled then the cathode current collector is obtained.

In an embodiment of gluing, conductive glue is adopted to bond two pieces of graphite foil and the carrier.

The cathode active material participates in the cathode reaction which is capable of reversibly intercalating and deintercalating the first metal ions.

Specifically the cathode active material has spinel structure, layered structure, or olivine structure.

Preferably the cathode active material is capable of reversibly intercalating and deintercalating lithium ions, sodium ions, magnesium ions or zinc ions.

The cathode active material could be a spinel structure compound which is capable of intercalating and deintercalating Li ions having the general formula $Li_{1+x}Mn_yM_zO_k$, wherein $-1 \leq x \leq 0.5$, $1 \leq y \leq 2.5$, $0 \leq z \leq 0.5$ and $3 \leq k \leq 6$. M is selected from at least one metal of Na, Li, Co, Mg, Ti, Cr, V, Zn, Zr, Si and Al. Preferably the cathode active material is $LiMn_2O_4$. More preferably the cathode active material is $LiMn_2O_4$ that has been doped, coated, or modified.

The cathode active material could be a layered structure compound which is capable of intercalating and deintercalating Li ions having the general formula $Li_{1+x}M_yM'_zM''_cO_{2+n}$, wherein $-1 \leq x \leq 0.5$, $0 \leq y \leq 1$, $0 \leq z \leq 1$, $0 \leq c \leq 1$ and $-0.2 \leq n \leq 0.2$. M, M' and M'' are selected from at least one of the following: Ni, Mn, Co, Mg, Ti, Cr, V, Zn, Zr, Si and Al.

The cathode active material could be an olivine structure compound which is capable of intercalating and deintercalating Li ions having the general formula $Li_xM_{1-y}M'_y(X'O_4)_n$, wherein $0<x \leq 2$, $0 \leq y \leq 0.6$ and $1 \leq n \leq 1.5$. M is selected from Fe, Mn, V and Co. M' is selected from at least one of Mg, Ti, Cr, V and Al. X' is selected from at least one of S, P and Si.

Preferably the cathode active material is selected from at least one of $LiMn_2O_4$, $LiFePO_4$ or $LiCoO_2$.

In the current lithium battery industry, almost all cathode materials are doped, coated or modified by various methods. However these modifications may make the chemical formula of the material more complex. For example, $LiMn_2O_4$ is no longer able to represent the general formula of a "lithium manganese oxide" that is widely used. Strictly speaking, the formula $LiMn_2O_4$ should include the spinel structure cathode materials of a variety of modifications and be consistent with the general formula $Li_{1+x}Mn_yM_zO_k$. Similarly the chemical formula of $LiCoO_2$ and $LiFePO_4$ described herein will be understood to include the materials of a variety of modifications and to be consistent with the general formula $Li_xM_{1-y}M'_y(XO_4)_n$ and $Li_{1+x}M_yM'_zM''_cO_{2+n}$.

When the cathode active material is a lithium ion intercalation-deintercalation compound, it can be selected from $LiMn_2O_4$, $LiFePO_4$, $LiCoO_2$, $LiM_xPO_4$, $LiM_xSiO_y$ (where M is a metal with a variable valence) and other compounds.

Moreover the sodium ions intercalation-deintercalation compound $NaVPO_4F$, the magnesium ions intercalation-deintercalation compound $MgM_xO_y$ (where M is a metal and $0.5<x<3$, $2<y<6$) and other compound with similar function could all be used as the cathode active material.

Preferably the cathode comprises a cathode plate and a binding layer arranged between the cathode plate and the cathode current collector. The cathode plate comprises a cathode material, the cathode material comprises the cathode active material, and the binding layer comprises a binder and a conductive agent.

The binder in the binding layer can increase the binding force between the cathode plate and the cathode current collector. The conductive agent in the binding layer can decrease the interface impedance between the cathode plate and the cathode current collector, and thereby the conductive interface between the cathode plate and the cathode current collector is improved.

Preferably the binder material is selected from polytetrafluoroethylene (PTFE), polyvinylidene fluoride (PVDF), acrylonitrile copolymer (LA133), hydroxypropyl methyl cellulose (HPMC), poly ethylene oxide (PEO), polyacrylamide (PAM) or a mixture of sodium carboxymethyl cellulose (CMC) and styrene butadiene rubber (SBR).

Preferably the material of the conductive agent is selected from at least one of graphite, carbon nanotubes, graphene, carbon black and carbon fiber.

Preferably the weight proportion range of the binder in the binding layer is between 1 percent and 70 percent, and the weight proportion range of the conductive agent in the binding layer is between 30 percent and 99 percent.

Preferably, according to designed battery capacity, the weight range of the binding layer per ampere hour is 0.5 g to 1 g. For example, if the capacity of the battery is 5 Ah, then the weight range of the binding layer is 2.5 g to 5 g.

In prior art the method to prepare cathode is usually to coat slurry with active material on a current collector. For example, in lithium ion battery the slurry containing graphite is coated on a copper foil to form an anode. In lead-acid batteries the lead paste is coated on grid to form an anode. In this process only the whole electrode can be weighed when sorting electrode. Concerning uneven distribution of weight of current collector, the weight of active material cannot be accurately measured, thus electrode capacity will be different and the battery consistency and qualification rate will be affected.

The proportions of the cathode active material, the binder and the conductive agent adopted in the preparation of the cathode provided by the present invention are consistent, the cathode current collector also chooses a material which is good in consistency, and therefore the consistency of the obtained cathode is high. In addition, since the binding layer binds the cathode plate and the cathode current collector together, not only is the binding force between the cathode plate and the cathode current collector increased, but also the interface impedance between the cathode plate and the cathode current collector is decreased, and thereby the interface properties of the cathode plate and the cathode current collector are improved.

In specific embodiments, when the cathode is prepared, besides the cathode active material, according to actual circumstance, the cathode material also comprises a cathode conductive agent and a cathode binder, which are used to increase the performance of the cathode.

The cathode conductive agent accounts for 1 to 15 percent by mass of the cathode material. The cathode conductive agent is selected from at least one of a conductive polymer, conductive oxide, conductive ceramic, activated carbon, graphene, carbon black, graphite, carbon fiber, metal fiber, metal powder and metal sheet.

Preferably the cathode conductive agent is graphite which accounts for 10 to 14 percent by mass of the cathode material.

More preferably the cathode conductive agent is a composite conductive agent containing carbon nanotubes and an acetylene black.

Both the carbon nanotubes and the acetylene black are common conductive agents with good electrical conductivity. Although the acetylene black is good in electrical conductivity and low in cost, the conductive path of the acetylene black is short, the acetylene black can easily agglomerate in the process of charge and discharge, and as a result, the electrical conductivity will decrease; moreover, oxidation reaction can easily take place between the acetylene black and water in the aqueous electrolyte solution during charge, and as a result, the acetylene black will be consumed and corroded, causing an increase in the internal resistance of the battery. Although the carbon nanotubes are good in electrical conductivity and have a long conductive path, the cost of the carbon nanotubes is high, the carbon nanotubes can also easily agglomerate in the process of charge and discharge, and as a result, the electrical conductivity will decrease as well, moreover, because the specific surface area of the carbon nanotubes is large, the contact area between the carbon nanotubes and the water in the electrolyte solution is large, and as a result, the carbon nanotubes can also be oxidated and corroded easily by the water.

In order to make the conductive agent in the cathode material have both electrical conductivity and stability, the ratio of the carbon nanotubes to the acetylene black in the composite conductive agent is controlled within a certain range, so that the two types of conductive agents can have a synergistic effect, achieving better conductive and anti-oxidation effects.

Specifically, the mass ratio of the carbon nanotubes to the acetylene black in the composite conductive agent is controlled within a range between 0.25 and 1.25, and more preferably, the weight ratio of the carbon nanotubes to the acetylene black in the composite conductive agent is controlled within a range between 0.3 and 1.

On one hand, the tubular carbon nanotubes can be formed into a network-like conductive path, the granular acetylene black particles are distributed evenly in the conductive network, so that voids existing in the conductive network can be connected together, and moreover, the conductive carbon nanotubes network can also connect all the acetylene black particles together, so that a continuous, effective three-dimensional conductive path is formed. On the other hand, all the acetylene black particles get into a netty structure formed by the carbon nanotubes, and can be effectively and tightly surrounded by such a network, consequently, the large-area contact between the acetylene black particles and the electrolyte solution is prevented, and thereby the probability of oxidating the acetylene black particles is decreased; moreover, the carbon nanotubes network or among cells will be also filled with the acetylene black particles, so that the contact area between the carbon nanotubes and the electrolyte solution is reduced greatly, and thereby the probability of oxidating the carbon nanotubes is decreased as well. By controlling the mixing ratio of the carbon nanotubes to the acetylene black, the composite conductive agent can form the effective, continuous network structure, consequently, the resistance of the whole cathode can be decreased, the conductive path between the cathode material particles can be enhanced, the performance of the cathode can be improved, moreover, the stability and oxidation resistance of the conductive agent itself can be enhanced, and thereby the overall performance of the battery is improved. If the number of the carbon nanotubes in the composite conductive agent is too large, then the acetylene black cannot sufficiently connect the voids of the network, and also cannot fill the cells, and as a result, the conductive effect and the anti-oxidation effect are poor. If the number of the carbon nanotubes is too small, then such a continuous three-dimensional network structure cannot be formed sufficiently, the acetylene black particles cannot be surrounded tightly by the conductive network as well, and as a result, the conductive effect and the anti-oxidation effect also cannot achieve an expected goal.

Therefore, if the carbon nanotubes and the acetylene black are going to effectively play a synergistic conductive and anti-oxidation effect, the proportions of both must be controlled within predetermined ranges. In order to make the composite conductive agent exert a better synergistic effect, the length range of the carbon nanotubes is between 50 μm and 200 μm, the diameter range is between 5 nm and 30 nm, and the particle size range of the acetylene black is between 10 nm to 50 nm.

For the cathode material containing the cathode active material and the conductive agent, in order to make the conductive network sufficiently play its role, the amount of the added conductive agent and the weight of the active material also need to be controlled within appropriate ranges, at this point, the cathode active material particles are surrounded and connected by the conductive agent, and the conductive agent particles also fill the voids among the cathode active material particles, so that the conductive agent is in sufficient contact with the cathode active material particles.

Specifically, the mass ratio of the composite conductive agent to the cathode active material is 0.005 to 0.3, and preferably, the mass ratio of the composite conductive agent to the cathode active material is 0.1 to 0.3.

When the cathode active material particles are dispersed uniformly in the network of the composite conductive agent according to a certain proportion, the conductive contact between all the particles is increased greatly, electrical conductivity will be increased greatly, in addition, dispersing the cathode active material particles in the conductive network will also further reduce the contact area between the composite conductive agent and the electrolyte solution, and thereby the conductive agent will further be prevented from being oxidated. If the content of the composite conductive agent is too much, it will cause the content of the cathode active material in cathode monomer volume to become less, the density of the cathode active material will be decreased, as a result, the capacity of the battery will be decreased, moreover, the contact between the conductive agent and the electrolyte solution will be increased, causing the conductive agent to be oxidated, and consequently, the cycling performance will be decreased; if the content of the composite conductive agent is too little, then the conductive path for electrons in the cathode active material will become less, and as a result, the cathode active material cannot be surrounded sufficiently by the conductive network, causing the low utilization rage of the cathode active material, a decrease in the capacity of the cathode and a decrease in rate capability.

Therefore, in order to ensure that the cathode material has excellent electrical conductivity under the battery system of the present invention, the cathode conductive agent not only has to have excellent electrical conductivity, but also has to have excellent stability and oxidation resistance, and this requires the ratio of the cathode active material to the composite conductive agent and the ratio of the carbon nanotubes to the acetylene black in the composite conductive agent to be controlled within predetermined ranges.

FIG. 1 is a structural schematic diagram of the cathode material composed of the composite conductive agent and the cathode active material and provided with the three-dimensional network-like structure in an exemplary embodiment. Known from the drawing, since the carbon nanotubes has a three-dimensional tubular structure, the carbon nanotubes can be formed into a crisscross three-dimensional network structure; the acetylene black particles are dispersed therein to connect voids in the network together, so that a continuous conductive network is formed; and the cathode active material $LiMn_2O_4$ is distributed uniformly in this conductive network. Such a cathode material structure can realize: (1) a long-distance conductive path based on the combination of the carbon nanotubes and the acetylene black can be formed to increase the conductive contact between $LiMn_2O_4$ particles and between $LiMn_2O_4$ particles and the conductive agent; (2) the interconnected network structure is favorable for the transmission of the electrolyte solution between electrodes; and (3) the acetylene black particles and $LiMn_2O_4$ particles are distributed and arranged in the network and surrounded by the network, the three are connected together tightly, forming a strong composite structure, and thereby the long cycle life of the cathode active material can be realized. Based on the characteristics of the structure design, the electrochemical properties of the battery will be increased greatly.

The composite conductive agent can be mixed by simple mechanical grinding, and is then mixed with the active material, or the cathode active material, the carbon nanotubes and the acetylene black can be directly mixed mechanically to prepare cathode slurry, so that the cathode is prepared, and of course, the composite conductive agent can also be added into the cathode in other ways.

The binder is selected from one of polyethylene oxide, polypropylene oxide, polyacrylonitrile, polyimides, polyesters, polyethers, fluorinated polymers, polydivinyl polyethylene glycol, polyethylene glycol diacrylate, polyethylene glycol dimethacrylate and mixtures and derivatives thereof. Preferably the binder is polytetrafluoroethylene (PTFE), polyvinylidene fluoride (PVDF) or styrene butadiene rubber (SBR).

Specifically, the cathode active material is configured on the cathode current collector by slurry coating.

Specifically, when the cathode slurry is prepared, a dispersing agent is adopted to ensure that the cathode active material, the binder and the conductive agent can be mixed uniformly, and the dispersing agent can be but is not limited to water.

In general, the slurry machine has a slurry storage tank. The cathode current collector is guided into the storage tank by rollers and dipped into the slurry of which the viscosity is 3000-100000 mPa·s. Then the cathode current collector is pulled out of the storage tank and the slurry is adhered thereon. The thickness of the slurry can be controlled by blade which can scrape off the excess slurry and make the slurry more uniform.

Then the cathode current collector coated with the slurry is dried. Usually the solvent in the slurry is removed by evaporation under atmospheric or low pressure at ambient or elevated temperature. The removal speed of solvent is maintained basically unchanged along the surface of the slurry. Preferably the condition of drying is under atmospheric pressure at 50-130° C., so obtained electrode plate has a more uniform thickness. Finally, the cathode plate is cut to a predetermined size.

In the present invention, the graphite foils wrapped on the carrier are used as the cathode current collector, the graphite foil current collector can be adopted directly to prepare the cathode. The graphite foil has enhanced mechanical property and lighter weight, consequently, not only is the cathode preparation process simplified, but also the cost of the battery is reduced, and thereby the battery is qualified to be applied commercially.

The anode of the battery of the present invention is described and explained in detail hereinafter.

According to its different structures and functions, the anode can be the following three different types of forms.

In the first exemplary embodiment, the anode only comprises an anode current collector, and moreover, the anode current collector only serves as a carrier for electron conduction and collection, and does not participate in electrochemical reaction.

The material of the anode current collector is selected from at least one metal of Ni, Cu, Ag, Pb, Mn, Sn, Fe, Al or a passivated metal thereof or silicon or a carbon based material. The carbon based material includes graphite materials, such as commercial graphite pressed foil, wherein graphite weight rate is in the range 90-100%. The material of the anode current collector can be stainless steel or passivated stainless steel. The stainless steel could be but not limited to stainless steel net and stainless steel foil. The mode of stainless steel could be but not limited to 300 series stainless steel, such as stainless steel 304, 316 or 316L. In addition, the material of the anode current collector can be selected from a metal with an electroplating layer or coating layer of high hydrogen potential, which is selected at least one of C, Sn, In, Ag, Pb, Co, or an alloy or oxide thereof. The thickness range of the electroplating layer or coating layer is 1-1000 nm, such as copper or graphite foil coated with tin, lead or silver.

In a second preferred embodiment, the anode comprises an anode current collector and an anode active material. The anode active material is the second metal. If the second metal ion in the electrolyte is $Zn^{2+}$, the corresponding anode active material is metal Zn. For example, the anode comprises brass foil and zinc foil, brass foil serves as the anode current collector, zinc foil serves as the anode active material which participates in the anode reaction.

Preferably the anode active material is selected from one metal of Zn, Ni, Fe, Cr, Cu, Mn, Sn or Pb.

The anode current collector is as described in the first preferred embodiment.

The second metal could be in form of sheet or powder.

When a second metal sheet is used as the anode active material, the second metal sheet and the anode current collector are configured together to form a composite layer.

When a second metal powder is used as the anode active material, the second metal powder is casted to slurry which being coated on the anode current collector to form an anode. When preparing an anode, except for the anode active material (i.e. the second metal powder) an anode conductive agent and an anode binder could be added to enhance the performance of the anode.

In a third preferred embodiment, the second metal sheet is used as the anode, which serves as an anode current collector and anode active material.

The electrolyte of the present invention is described and explained in detail hereinafter.

The electrolyte comprises a solute and a solvent. The solute at least can ionize out the first metal ions and the second metal ions, the first metal ions can reversibly deintercalate from or intercalate into the cathode in the process of charge and discharge, the second metal ions can be reduced to deposit at the anode in the process of charge to become a second metal, and the second metal can be oxidized to the dissolved second metal ions in the process of discharge The solvent is used to dissolve the solute and the solute ionizes in the solvent, and ultimately cations and anions which can move freely are generated in the electrolyte.

Preferably the solvent is an aqueous solution and/or an alcohol solution, the alcohol includes but is not limited to methanol or ethanol.

The electrolyte comprises a solute that can ionize to the first metal ions and the second metal ions. The first metal ions can deintercalate from the cathode active material during a charge cycle and intercalate into the cathode active material during a discharge cycle.

Preferably the first metal ions are selected from lithium ions, sodium ions, magnesium ions or zinc ions.

The second metal ions in the electrolyte can be reduced to a metal and deposited on the anode during a charge cycle and be oxidized from the metal to the second metal ions during a discharge cycle Preferably the second metal ions are selected from manganese ions, iron ions, copper ions, zinc ions, chromium ions, nickel ions, tin ions or lead ions. More preferably the second metal ions are zinc ions.

In a preferred embodiment, the first metal ions are lithium ions, while the second metal ions are zinc ions, i.e. the cations of the electrolyte include lithium ions and zinc ions.

The anions in the electrolyte can be any kind that does not affect the electrochemical reaction in cathode and anode, and the dissolution of the solute in solvent. For example, the anions could be sulfate ions, chloride ions, nitrate ions, acetate ions, formate ions, phosphate ions, alkyl sulfonate and mixtures thereof.

Preferably the anions of the electrolyte are methyl sulfonate ions, which can further enhance the solubility of the first metal ions and the second metal ions, and of which the cost is relative low.

The concentration of the ions in the electrolyte could be adjusted according to the different electrolyte, solvent, and application field of the battery.

Preferably the concentration of the first metal ions in the electrolyte is 0.1 mol/L to 10 mol/L.

Preferably the concentration of the second metal ions in the electrolyte is 0.5 mol/L to 15 mol/L.

Preferably the concentration of the anions in the electrolyte is 0.5 to 12 mol/L.

In order to optimize the performance of a battery, the pH range of the electrolyte is preferably 3 to 7, which ensure the concentration of the second metal ions in the electrolyte and avoid co-embedment of protons. Then a battery with the electrolyte in the present invention has a high capacity and rate discharge performance.

Preferably the battery further comprises a bismuth compound additive which is added in the anode or electrolyte or in the anode and electrolyte both. The bismuth compound is selected from bismuth trioxide and/or bismuth nitrate.

Preferably the amount of a bismuth compound in the anode is as follows: When a bismuth trioxide is used alone, the weight percentage of the bismuth trioxide in the anode is 0.1 to 10%.

When a bismuth nitrate is used alone, the weight percentage of the bismuth nitrate in the anode is 0.1 to 10%.

The bismuth compound in the anode could be the mixture of the bismuth trioxide and the bismuth nitrate.

Preferably the amount of the bismuth compound in the electrolyte is as follows:

When a bismuth trioxide is used alone, the weight percentage of the bismuth trioxide in the electrolyte is 0.01 to 5%.

When a bismuth nitrate is used alone, the weight percentage of the bismuth nitrate in the electrolyte is 0.01 to 5%.

The bismuth compound in the electrolyte could also be the mixture of the bismuth trioxide and the bismuth nitrate.

More preferably a bismuth compound is added both in the anode and the elerolyte to ensure a better performance of the battery.

When a bismuth compound is added into the anode and/or the electrolyte, according to the different conditions of the morphological structures of the anode and the electrolyte solution, different addition methods can be chosen. The addition method can be chosen from physical methods or chemical methods. The physical methods include but are not limited to attaching the bismuth compound onto the anode or a separator by a suspension coating method, plating the bismuth compound onto the anode or the separator under vacuum and magnetron-sputtering the bismuth compound onto the anode or the separator; and the chemical method includes electrochemically plating the bismuth compound onto the anode, etc.

Preferably the battery further comprises a separator. The separator has no special requirements, as long as it allows the electrolyte passing and is electron insulation. Various organic lithium-ion battery separators can be used in the present invention. The separator could also be porous ceramic separator and other materials.

The cathode of the battery provided by the present invention adopts a composite graphite current collector, such as graphite wrapping a nylon net. The cathode current collector is light in weight, has good mechanical property, and is easy to process. More importantly, the float-charging life of the battery adopting the composite graphite current collector is improved notably, so the battery provided by the invention has a good commercial application prospect.

The present invention also provides a battery pack, the battery pack comprises a plurality of batteries, and specifically, the battery pack is produced by connecting two or more batteries in series, in parallel or in series and parallel. The capacity and voltage of the battery pack can be regulated freely by the series connection and/or parallel connection modes of the batteries. The battery and the battery pack constructed from the batteries which are provided according to the present invention can be used as power supplies for vehicles and transportation means such as trains, and can be used as fixed/installable power supplies such as uninterrupted power supplies.

Embodiment 2

The present invention further provides a cathode, the cathode comprises a cathode plate, a cathode current collector and a binding layer arranged between the cathode plate and the cathode current collector, the cathode plate comprises a cathode active material from or into which a first metal ions can be deintercalated or intercalated reversibly, and the binding layer comprises a binder and a conductive agent.

The binder in the binding layer can increase the cohesive strength between the cathode plate and the cathode current collector and the conductive agent in the binding layer can reduce interface resistance between the cathode plate and the cathode current collector, thus the conductive interface between the cathode plate and the cathode current collector could be improved.

Preferably the material of binder is selected from polytetrafluoroethylene (PTFE), polyvinylidene fluoride (PVDF), acrylonitrile copolymer (LA133), hydroxypropyl methyl cellulose (HPMC), poly ethylene oxide (PEO), polyacrylamide (PAM) or a mixture of sodium carboxymethyl cellulose (CMC) and styrene butadiene rubber (SBR).

Preferably the material of the conductive agent is chosen from at least one of graphite, carbon nanotubes, graphene, carbon blacks and carbon fibers.

Preferably the weight proportion range of the binder in the binding layer is between 1 percent and 70 percent, and the weight proportion range of the conductive agent in the binding layer is between 30 percent and 99 percent.

Preferably the weight range of the binding layer per ampere hour is between 0.5 g to 1 g. For example, if the capacity of the battery is 5 Ah, the weight range of the binding layer is 2.5 to 5 g.

The cathode current collector only serves as a carrier for electron conduction and collection, and does not participate in electrochemical reaction, that is, in the working voltage range of the battery, the cathode current collector can stably exist in the electrolyte solution nearly without side reaction, thus ensuring that the battery has stable cycling performance.

A variety of materials and compositions can be chosen by the cathode current collector.

[Choice 1]

The material of the cathode current collector is selected from one of carbon based material, metal or alloy.

The carbon based material is selected from one of glassy carbon, graphite foil, graphite plate, carbon foam, carbon felt and carbon fibre. In one embodiment the cathode current collector is graphite, such as commercial processed graphite foil in which the weight ratio of graphite is 90 percent to 100 percent.

The metal is selected from one of Al, Fe, Cu, Pb, Ti, Cr, Mo, Co, Ag or passivated metal thereof.

The alloy is selected from one of stainless steel, carbon steel, Al alloy, Ni alloy, Ti alloy, Cu alloy, Co alloy, Ti—Pt alloy, Pt—Rh alloy, or passivated alloy thereof.

The stainless steel includes stainless steel foil or stainless steel net. Specifically the mode of stainless steel can be but not limited to one of 304, 316 and 316L.

The main purpose of passivating the cathode current collector is to form a passivated oxide film thereon, so that the cathode current collector does not participate in electrochemical reaction during the charge and discharge cycle, which ensures the stability of battery. The method includes chemical or electrochemical passivation.

Chemical passivation method comprises the process of oxidizing the cathode current collector in an oxidizing agent. The oxidizing agent should satisfy the requirement of forming a passivation film on the cathode current collector but not dissolving the current collector. The oxidizing agent is selected from but not limited to concentrated nitric acid and ceric sulphate ($Ce(SO_4)_2$).

The electrochemical passivation method comprises the process of electrochemical oxidizing the cathode current collector or charging and discharging of the battery with the cathode current collector to form a passivation film thereon.

[Choice 2]

The cathode current collector is wrapped by a conducting film, wherein the material choice of the cathode current collector can be seen in [Choice 1], and therefore are not repeated anymore here.

The conductive film should comply with the following requirements: stable and insoluble in the electrolyte, no swelling, no oxidization in high voltage, easy to process into a dense, impermeable and electrically conductive film. On the one hand, the conductive film could protect the cathode current collector from being corroded by the electrolyte. On the other hand, it helps to reduce the contact resistance between the cathode current collector and the cathode plate and improve the battery energy.

Preferably the thickness of the conductive film is 10 μm to 2 mm, thus the conductive film is able to effectively protect the cathode current collector, reduce the contact resistance between the cathode plate the cathode current collector and improve the battery energy.

The cathode current collector has two opposite sides. Preferably both sides of the cathode current collector are coated with the conductive film.

The conductive film comprises a polymer as essential component. The weight percentage of polymer in the conductive film is 50 to 95%. Preferably the polymer is selected from thermoplastic polymer. There are two possible ways to make the conductive film conductive: (1) the polymer is a conductive polymer; (2) the conductive film further comprises conductive filler.

The material of conductive polymer should be conductive and electrochemically inert. Specifically the conductive polymer includes, but is not limited to, polyacetylene, polypyrrole, polythiophene, polyphenylene sulfide, polyaniline, polyacrylonitrile, polyquinoline, polyparaphenylene and mixtures thereof. The conductive polymer itself could be conductive and moreover it could be doped or modified to further improve its conductivity. The conductive polymer is preferably polyaniline, polypyrrole, polythiophene and polyacetylene in view of conductivity and stability.

The material of the conductive filler should satisfy the requirements of small surface area, difficult oxidation, high crystallinity, good conductivity but electrochemically inert.

The material of the conductive filler includes, but is not limited to conductive polymer, carbon based materials or metal oxides. The weight percentage of the conductive filler in the conductive film is 5 to 50%. The average particle size of the conductive filler is not particularly limited, usually in the range of 100 nm to 100 nm.

When the conductive film comprises the conductive filler, the polymer of the conductive film preferably comprises a non-conductive polymer which plays a role in combining the conductive filler. The non-conductive polymer could enhances the binding of electrically conductive filler, improves the reliability of the battery. Preferably the non-conductive polymer is a thermoplastic polymer.

The thermoplastic polymer includes, but is not limited to polyolefine such as at least one of polyethylene, polypropylene, polybutene, polyvinyl chloride, polystyrene, polyamide, polycarbonate, polymethyl methacrylate, polyoxymethylene, polyphenylene ether, polysulfone, polyether sulfone, styrene-butadiene rubber and polyvinylidene fluoride, wherein the thermoplastic polymer preferably is polyolefins, polyvinylidene fluoride or polyamides. These polymers are easily melted to compound together with the cathode current collector and the cathode plate. In addition, these polymers have a large potential window, so that the cathode can be more stable and the battery has a low weight and high density output.

The conductive film is coated on the cathode current collector by means of hot pressing, vacuum pumping or spraying.

[Choice 3]

More preferably, the cathode current collector comprises a first carrier and graphite, and the graphite wraps the first carrier.

The first carrier itself is electrochemically inactive, and according to the common knowledge of those skilled in the art, electrochemical inactivity means that the first carrier does not participate in any electrochemical reactions. The first carrier mainly plays the role of bearing the graphite, thus increasing the mechanical property of the graphite, and the graphite mainly plays the role of collecting and conducting electrons.

In order to ensure that the cathode has high energy density, the thickness of the cathode current collector has to be chosen properly. Preferably, the thickness range of the graphite is between 0.1 mm and 0.2 mm; the thickness of the first carrier is less than 1 mm, and preferably, the thickness range of the first carrier is between 0.1 mm and 0.2 mm.

Preferably, the content of carbon in the graphite is greater than 97 percent, so the affection of impurities in the graphite on the performance of the battery is prevented.

Preferably, the morphology of the graphite is a graphite foil. In general, the graphite foil is a flexible, light and thin paper-like graphite which is produced from graphite powder by a series of processing and press-rolling. Preferably, the density of the graphite foil is greater than 1.0 g/cm$^3$, the higher the density of the graphite foil is, the denser its structure is, consequently, it can be ensured that the surface of the graphite foil in an aqueous battery cannot easily blister, and the properties are stable In the prior art, because of high temperature resistance, high heat conductivity and easiness in use, the graphite foil is often used as a heat conduction material for electronic products and a sealing material for industries such as instruments and machinery. In the present invention, because the graphite foil is used as the cathode current collector, the weight of the cathode is reduced, moreover, because the stability of the graphite foil in aqueous electrolyte solution is good, the battery has a longer float-charging life, furthermore, the cost of the battery is reduced, and thereby the battery has a commercial application prospect.

The material of the carrier may be selected from one of polyethylene terephthalate (PET), polybutylene terephthalate (PBT), polyethylene (PE), polypropylene (PP), polyamide (PA), polyurethane (PU) and polyacrylonitrile (PAN). These materials are stable in the cathode plate without participating in the electrochemical reaction, thus the battery has a high energy density output and low weight. Preferably the carrier is a nylon net, i.e. polyamide.

In another embodiment of the first carrier, the first carrier is a double-sided adhesive tape, and two graphite foils are stuck on the two surfaces of the double-sided adhesive tape.

Preferably, the first carrier has a porous structure, and specifically, the pore size range of the first carrier is from 50 meshes to 200 meshes. The porous first carrier helps the graphite foils to be attached on the first carrier, and increases the stripping resistance of the graphite foils and the first carrier, and thereby the stable operation of the cathode current collector is guaranteed.

Preferably, the graphite foil wraps the first carrier by means of hot pressing, rolling or gluing.

In hot pressing, a polymer material in the first carrier is heated under a temperature higher than the glass transition temperature of the polymer in the first carrier to become soft and reach a state for sticking the graphite foils, at the same time, certain pressure is applied, the magnitude of the pressure is not especially limited, and the pressure is mainly used to make the combination between the graphite foils and the first carrier tighter. In the embodiment of hot-pressing, the first carrier that has been cut according to a predetermined size is placed in the two pieces of graphite foils, and the graphite foils and the first carrier are combined by heating and applying a certain pressure.

In the embodiment of rolling, a first carrier nylon net that has been cut to a predetermined size is placed between the two pieces of graphite foils, cold-rolling processing is then carried out, and thereby the cathode current collector is prepared.

In the embodiment of gluing, conductive glue is adopted to stick the graphite foils and the first carrier together.

The cathode active material in the cathode plate participates in cathode reaction, and specifically, the cathode active material has a spinel structure, a layered structure or an olivine structure.

The material of the cathode active material has been described as above, and no more repeated here.

In the specific embodiments, when the cathode plate is prepared, a binder can also be added into the cathode active material, and the binder helps the cathode active material to be uniformly bonded together, so that the cathode plate can be formed by processing. The weight proportion range of the binder in the cathode plate is 0.5 to 10 percent. Specifically the binder is selected from but not limited to at least one of polytetrafluoroethylene (PTFE), polyvinylidene fluoride (PVDF), sodium carboxymethyl cellulose (CMC), sodium carboxymethyl cellulose derivatives (CMC derivation), styrene butadiene rubber and styrene butadiene rubber derivatives (SBR derivation). Styrene butadiene rubber derivatives comprise a hydrophilic styrene butadiene rubber (PSBR100) obtained by chemical modification.

In the specific embodiments, when the cathode plate is prepared, a conductive agent can also be added into the cathode active material, the conductive agent mainly plays the role of increasing the electron conduction capability of the cathode active material in the cathode plate, and the percentage by weight of the conductive agent in the cathode plate ranges between 0.5 percent and 30 percent. The conductive agent comprises at least one of conductive polymer, carbon nanotubes and activated carbon, graphene, carbon black, graphite, carbon fiber, conductive ceramics. Carbon black includes but not limited to acetylene black, carbon black (Ketjen black, KB Ketjen black and super-p). The conductive agent may also include a metal oxide. The metal oxide includes but not limited to lead oxide and tin oxide.

In the specific embodiments, when the cathode plate is prepared, a cathode slurry which contains cathode active material, the binder and the conductive agent is first prepared, the cathode slurry is then coated on a stainless steel square tray, and is taken out of the stainless steel square tray for later use after being dried and rolled to be shaped.

Preferably, the cathode plate also comprises an electrochemically inactive second carrier, the cathode active material is formed on the second carrier, the second carrier is provided with a first surface and a second surface that are arranged oppositely, and not limited, the cathode active material is formed on the first surface or second surface of the second carrier, or the cathode active material is formed on both the first surface and second surface of the second carrier.

A preparation method for the cathode plate is not especially limited. In the specific embodiments, a slurry containing the cathode active material is first prepared, the slurry is then formed on the second carrier by slurry coating.

The second carrier mainly plays the role of bearing the cathode active material, the second carrier itself is electrochemically inactive, and according to the common knowledge of those skilled in the art, electrochemical inactivity means that the second carrier does not participate in any electrochemical reactions, stably exists in the cathode plate, and only exists as a substrate for bearing the active material layer.

In one specific embodiment, the second carrier is insulated and has a porous structure. Specifically, the pore size range of the second carrier is between 50 meshes and 200 meshes, and thus, under the premise of ensuring that the second carrier has certain mechanical property, not only does it help the cathode active material to be attached to the second carrier and increase the stripping resistance of the cathode active material and the second carrier, ensure the stable operation of the cathode plate, but also the transfer of ions in the cathode active material is facilitated.

In another specific embodiment, the second carrier can conduct electrons, and the material of the second carrier includes but is not limited to conductive resin or metal.

The thickness of the second carrier is not especially limited, however, in order to ensure that the cathode plate has high energy density, the thickness of the cathode plate needs to be controlled, and specifically, the thickness range of the cathode plate is between 0.3 mm and 1.5 mm, while the thickness of the second carrier as one of the components of the cathode plate is preferably less than 1 mm.

Specifically, in terms of the preparation process, the second carrier can be a non-woven fabric, and the non-woven fabric does not undergo textile processing, and is only stuck by a physical means. The components of the non-woven fabric are not especially limited, as long as the components of the non-woven fabric can meet conditions such as electrochemical inactivity. The non-woven fabric is light in weight, stable in properties and low in cost, and is easy to shape. In the present embodiment, the non-woven fabric and the cathode active material are combined to be applied in the cathode plate, so the cathode plate is lighter in weight and has stable electrochemical properties.

The material of the carrier may be selected from one of polyethylene terephthalate (PET), polybutylene terephthalate (PBT), polyethylene (PE), polypropylene (PP), polyamide (PA), polyurethane (PU) and polyacrylonitrile (PAN). These materials are stable in the cathode plate without participating in the electrochemical reaction, thus the battery has a high energy density output and low weight.

In prior art the usual method to prepare cathode is to coat slurry containing active material on a current collector. For example in lithium ion battery the slurry containing graphite is coated on a copper foil to form an anode. In lead-acid batteries the lead paste is coated on grid to form an anode. In this process the whole electrode can only be weighed when sorting cathode. Concerning uneven distribution of weight of current collector, the weight of electrode active material cannot be accurately measured, thus electrode capacity will be different and the battery consistency and qualification rate will be affected.

The proportions of the cathode active material, the binder and the conductive agent adopted in the preparation of the cathode provided by the present invention are consistent, the cathode current collector also chooses a material which is good in consistency, and therefore the consistency of the obtained cathode is high. In addition, since the binding layer binds the cathode plate and the cathode current collector together, not only is the binding force between the cathode plate and the cathode current collector increased, but also the interface impedance between the cathode plate and the cathode current collector is also decreased, and thereby the interface properties of the cathode plate and the cathode current collector are improved.

The present invention also provides a battery comprising a cathode, an anode and an electrolyte. The cathode comprises a cathode plate, a cathode current collector and a binding layer arranged between the cathode plate and the cathode current collector. The cathode plate comprises a cathode active material which is capable of reversibly intercalating and deintercalating a first metal ions. The binding layer comprises a binder and a conductive agent. The electrolyte comprises a solvent capable of dissolving the first metal ions and a second metal ions that can be reduced to a metal during a charge cycle and be oxidized from the metal to the dissolved second metal ions during a discharge cycle.

The working principle of the battery may be summarized as follows: during a charge cycle, the first metal ions in the cathode active material deintercalate into the electrolyte, while, the second metal ions in the electrolyte are simultaneously reduced and deposited onto the anode as a second metal. During a discharge cycle, the second metal is oxidized to the second metal ions and dissolved in the electrolyte, the first metal ions in the electrolyte intercalate into the cathode active material.

The cathode plate, the binding layer and the cathode current collector have been introduced in detail above, and therefore are not repeated anymore here.

The anode and electrolyte solution of the battery have been introduced in detail in embodiment 1, and therefore are not repeated anymore here.

The battery provided by the present invention is an aqueous battery, and the working voltage range of the battery is normally from 1.4V to 2.1V. When the battery is charged, particularly float-charged, the cathode conductive agent can be oxidated under high voltage, causing the consumption of the conductive agent, as a result, the internal resistance of the cathode is increased, and the float-charging life of the battery is shortened. In order to solve the above-mentioned technical problem, the cathode plate and cathode current collector of the battery are combined by the binding layer, and the binding layer can enhance the binding force between the cathode plate and the cathode current collector and decrease interfacial internal resistance. More importantly, when the battery is charged, relative to the conductive agent in the cathode plate, a conductive carbon material in the binding layer connected with the cathode current collector will be corroded precedently, so that the conductive agent in the cathode plate can be prevented from being corroded and the utilization rate of the cathode active material can be increased, consequently, the cycling performance of the battery is improved, self-discharge is reduced, the change of the interfacial internal resistance of the cathode plate and the cathode current collector is not great in the process of float-charging the battery, and thereby the float-charging life of the battery is prolonged.

The present invention also provides a preparation method for the electrode, and the preparation method comprises the following steps:

The binder and the conductive agent are mixed in the dispersing agent, so that a slurry is prepared; the slurry is coated on a current collector to form a binding layer, and an electrode plate is stuck on the binding layer, and is dried to be shaped.

In the specific embodiments, the electrode plate is the cathode plate, the current collector is the cathode current collector, and the material and structures of the cathode plate, the cathode current collector and the binding layer have been introduced above, and therefore are not repeated anymore here.

The electrode prepared by the electrode preparation method provided by the present invention is high in consistency, moreover, the preparation process is simple, and industrial application is easy.

Embodiment 3

The invention provides a battery comprising a cathode, an anode and an electrolyte. The cathode comprises a cathode active material which is capable of reversibly intercalating-deintercalating a first metal ions. The electrolyte comprises a first metal ions and a second metal ions. The first metal ions deintercalate from the cathode active material during the charge cycle and intercalate into the cathode active material during the discharge cycle. The second metal ions are reduced to a metal during a charge cycle and are oxidized from the metal to the dissolved second metal ions during a discharge cycle. The cathode further comprises a composite conductive agent comprising carbon nanotubes and acetylene black, the mass ratio of the composite conductive agent to the cathode active material is 0.005 to 0.3, and the mass ratio of the carbon nanotubes to the acetylene black is 0.25 to 1.25.

The working principle of the battery may be summarized as follows: during a charge cycle, the first metal ions in the cathode active material deintercalate into the electrolyte, while, the second metal ions in the electrolyte are simultaneously reduced and deposited onto the anode as a second metal. During a discharge cycle, the second metal is oxidized to the second metal ions and dissolved in the electrolyte, the first metal ions in the electrolyte intercalate into the cathode active material.

The cathode active materials have been described as above.

The composite conductive agent is to reduce the resistance of the cathode and strengthen the conductive path between the cathode material particles.

Both the carbon nanotubes and the acetylene black are common conductive agents with good electrical conductivity. Although the acetylene black is good in electrical conductivity and low in cost, the conductive path of the acetylene black is short. The acetylene black can easily agglomerate in the process of charge and discharge, and as a result the electrical conductivity will decrease; moreover, oxidation reaction can easily take place between the acetylene black and water in the aqueous electrolyte solution during charge, and as a result, the acetylene black will be consumed and corroded, causing an increase in the internal resistance of the battery. Although the carbon nanotubes are good in electrical conductivity and have a long conductive path, the cost of the carbon nanotubes is high, the carbon nanotubes can also easily agglomerate in the process of charge and discharge, and as a result, the electrical conductivity will decrease as well; moreover, because the specific surface area of the carbon nanotubes is large, the contact area between the carbon nanotubes and the water in the electrolyte solution is large, and as a result, the carbon nanotubes can also be oxidated and corroded easily by the water.

In order to make the conductive agent in the cathode material have both electrical conductivity and stability, the ratio of the carbon nanotubes to the acetylene black in the composite conductive agent is controlled within a certain range, so that the two types of conductive agents can have a synergistic effect, achieving better conductive and anti-oxidation effects.

Specifically the mass ratio of the carbon nanotubes to the acetylene black in the composite conductive agent is controlled within a range between 0.25 to 1.25, and more preferably, the weight ratio of the carbon nanotubes to the acetylene black in the composite conductive agent is controlled within a range between 0.3 to 1.

On one hand, the tubular carbon nanotubes can be formed into a network-like conductive path, the granular acetylene black particles are distributed evenly in the conductive network, so that voids existing in the conductive network can be connected together, and moreover, the conductive carbon nanotubes network can also connect all the acetylene black particles together, so that a continuous, effective three-dimensional conductive path is formed. On the other hand, all the acetylene black particles get into a netty structure formed by the carbon nanotubes, and can be effectively and tightly surrounded by such a network, consequently, the large-area contact between the acetylene black particles and the electrolyte solution is prevented, and thereby the probability of oxidating the acetylene black particles is decreased, moreover, the carbon nanotubes network or among cells will be also filled with the acetylene black particles, so that the contact area between the carbon nanotubes and the electrolyte solution is reduced greatly, and thereby the probability of oxidating the carbon nanotubes is decreased as well. By controlling the mixing ratio of the carbon nanotubes to the acetylene black, the composite conductive agent can form the effective, continuous network structure, consequently, the resistance of the whole cathode can be decreased, the conductive path between the cathode material particles can be enhanced, the performance of the cathode can be improved, moreover, the stability and oxidation resistance of the conductive agent itself can be enhanced, and thereby the overall performance of the battery is improved. If the number of the carbon nanotubes in the composite conductive agent is too large, then the acetylene black cannot sufficiently connect the voids of the network, and also cannot fill the cells, and as a result, the conductive effect and the anti-oxidation effect are poor. If the number of the carbon nanotubes is too small, then such a continuous three-dimensional network structure cannot be formed sufficiently, the acetylene black particles cannot be surrounded tightly by the conductive network as well, and as a result, the conductive effect and the anti-oxidation effect also cannot achieve an expected goal.

Therefore, if the carbon nanotubes and the acetylene black are going to effectively play a synergistic conductive and anti-oxidation effect, the proportions of both must be controlled within predetermined ranges. In order to make the compound conductive agent exert a better synergistic effect, the length range of the carbon nanotubes is between 50 μm and 200 μm, the diameter range is between 5 nm and 30 nm, and the particle size range of the acetylene black is between 10 nm and 50 nm.

For the cathode material containing the cathode active material and the conductive agent, in order to make the conductive network sufficiently play its role, the amount of the added conductive agent and the weight of the active material also need to be controlled within appropriate ranges, at this point, the cathode active material particles are surrounded and connected by the conductive agent, and the conductive agent particles also fill the voids among the cathode active material particles, so that the conductive agent is in sufficient contact with the cathode active material particles.

Specifically, the mass ratio of the composite conductive agent to the cathode active material is 0.005 to 0.3, and preferably, the mass ratio of the composite conductive agent to the cathode active material is 0.1 to 0.3.

When the cathode active material particles are dispersed uniformly in the network of the composite conductive agent according to a certain proportion, the conductive contact between all the particles is increased greatly, electrical conductivity will be increased greatly, in addition, dispersing the cathode active material particles in the conductive network will also further reduce the contact area between the composite conductive agent and the electrolyte solution, and thereby the conductive agent will further be prevented from being oxidized. If the content of the composite conductive agent is too much, it will cause the content of the cathode active material in cathode monomer volume to become less, the density of the cathode active material will be decreased, as a result, the capacity of the battery will be decreased, moreover, the contact between the conductive agent and the electrolyte solution will be increased, causing the conductive agent to be oxidated, and consequently, the cycling performance will be decreased; if the content of the composite conductive agent is too little, then the conductive path for electrons in the cathode active material will become less, and as a result, the cathode active material cannot be surrounded sufficiently by the conductive network, causing the low utilization rage of the cathode active material, a decrease in the capacity of the cathode and a decrease in rate capability.

Therefore, in order to ensure that the cathode material has excellent electrical conductivity under the battery system of the present invention, the cathode conductive agent not only has to have excellent electrical conductivity, but also has to have excellent stability and oxidation resistance, and this requires the ratio of the cathode active material to the composite conductive agent and the ratio of the carbon nanotubes to the acetylene black in the composite conductive agent to be controlled within predetermined ranges.

FIG. 1 is a structural schematic diagram of the cathode material composed of the composite conductive agent and the cathode active material and provided with the three-dimensional network-like structure in an exemplary embodiment. Known from the drawing, since the carbon nanotubes has a three-dimensional tubular structure, the carbon nanotubes can be formed into a crisscross three-dimensional network structure; the acetylene black particles are dispersed therein to connect voids in the network together, so that a continuous conductive network is formed; and the cathode active material $LiMn_2O_4$ is distributed uniformly in this conductive network. Such a cathode material structure can realize: (1) a long-distance conductive path based on the combination of the carbon nanotubes and the acetylene black can be formed to increase the conductive contact between $LiMn_2O_4$ particles and between $LiMn_2O_4$ particles and the conductive agent; (2) the interconnected network structure is favorable for the transmission of the electrolyte solution between electrodes; and (3) the acetylene black particles and $LiMn_2O_4$ particles are distributed and arranged in the network and surrounded by the network, the three are connected together tightly, forming a strong composite structure, and thereby the long cycle life of the cathode active material can be realized. Based on the characteristics of the structure design, the electrochemical properties of the battery will be increased greatly.

The composite conductive agent can be mixed by simple mechanical grinding, and is then mixed with the active material, or the active material, the carbon nanotubes and the acetylene black can be directly mixed mechanically to prepare cathode slurry, so that the cathode is prepared, and of course, the composite conductive agent can also be added into the cathode in other ways.

When preparing the cathode, a cathode binder is usually added to enhance the performance of the cathode in addition to the cathode active material and the composite conductive agent.

The cathode binder is selected from one of polyethylene oxide, polypropylene oxide, polyacrylonitrile, polyimides, polyesters, polyethers, fluorinated polymers, polydivinyl polyethylene glycol, polyethylene glycol diacrylate, polyethylene glycol dimethacrylate and a mixture thereof and derivatives. Preferably the binder is polytetrafluoroethylene (PTFE), polyvinylidene fluoride (PVDF) or styrene butadiene rubber (SBR).

The cathode current collector is to conduct and collect electron and does not participate in the electrochemical reaction. Within the working voltage range of the battery, the cathode current collector can be stably present in the electrolyte without occurring side reaction, which ensures that the battery has a stable cycle performance.

The material of the cathode current collector has been described in [choice 1] and [choice 2] in the embodiment two and no longer repeated here.

The anode and the electrolyte battery have been described in detail in the embodiment 1 and no longer repeated here.

The present invention is further described below by the embodiments.

Embodiment 1-1

Cathode preparation: Lithium manganese oxide ($LiMn_2O_4$), graphite KS15 as a conductive agent, styrene-butadiene rubber (SBR) and sodium carboxymethylcellulose (CMC) as a binder are mixed in water according to a mass ratio of LMO:CMC:SBR:graphite equal to 86.5:1:2.5:10, so that a uniform cathode slurry is formed. A nylon net is immersed completely into the cathode slurry, the nylon net stuck with the cathode slurry is pulled out of a cathode slurry tank, a scraper is used to scrape off the redundant slurry on the cathode current collector according to a predetermined thickness, consequently, the thickness of the cathode slurry on the cathode current collector is controlled, and the slurry on the surface of the cathode current collector becomes more uniform. The cathode current collector stuck with the cathode slurry is dried under 60° C., so that an active material layer is formed, the cathode current collector is then pressed and cut into the size of 8×10 cm, so that a cathode plate is prepared, the thickness of the cathode plate is 0.4 mm, and the surface density of the cathode active material is 750 $g/m^2$.

The cathode current collector is prepared by rolling two layers of graphite foils with the thickness of 200 μm and a 80-mesh nylon net. The nylon net is wrapped by the graphite foils completely.

The prepared cathode plate and the cathode current collector with the same size are combined together by a binding layer. Specifically the binding layer comprises CMC, SBR and graphite KS15. CMC, SBR and KS15 are mixed in water according to the ratio of 1:2.5:96.5 and the coating amount of the binding layer is 0.5 g/Ah.

The anode comprises two zinc foils with the thickness of 50 μm and a brass foil with the thickness of 20 μm, and the brass foil is placed between the two zinc foils.

The electrolyte is an aqueous solution of 2 mol/L $ZnSO_4$ and 1 mol/L $Li_2SO_4$, and the pH of the electrolyte is regulated to 5.

The separator is AGM (Absorptive Glass Mat) glass fibers, bismuth trioxide is added to the separator, and is specifically added to the side of the separator which faces the anode, and the amount of the added bismuth trioxide is 0.2 g/Ah. The size of the separator and the anode is equal to that of the cathode.

Five cathodes and six anodes are arranged staggerly, the cathodes and the anodes are separated from each other by separators, and thereby a battery, of which theoretical capacity is about 5 Ah, is formed. After the assembly of the battery is completed, the electrolyte is injected until saturation.

Embodiment 1-2

In embodiment 1-2, lithium manganese oxide (LMO), graphite KS15 as a conductive agent, styrene-butadiene rubber (SBR) and sodium carboxymethylcellulose (CMC) as a binder are mixed in water according to a mass ratio of LMO:CMC:SBR:graphite equal to 84.5:1:2.5:12, so that uniform cathode slurry is formed.

The rest of the composition of the battery and the preparation method are the same as that of embodiment 1-1.

Embodiment 1-3

In embodiment 1-3, lithium manganese oxide (LMO), graphite KS15 as a conductive agent, styrene-butadiene rubber (SBR) and sodium carboxymethylcellulose (CMC) as a binder are mixed in water according to a mass ratio of LMO:CMC:SBR:graphite equal to 82.5:1:2.5:14, so that uniform cathode slurry is formed.

The rest of the composition of the battery and the preparation method are the same as that of embodiment 1-1.

Comparative Example 1-1

In comparative example 1-1, the cathode current collector is a nickeled punched carbon steel wrapped by PE (Polyethylene) conducting films. The nickeled punched carbon steel is placed between the two PE conducting films, the size of the conducting films is slightly greater than that of the cathode current collector. The conducting films and the cathode current collector are combined together by a pneumatic press under 115° C. to 140° C., the pressure is 0.5 MPa, and it should be ensured that the redundant portions of the conducting films relative to the punched carbon steel are fully sealed. The rest of the preparation and component materials of the cathode plate, the anode and the separator are the same as that of embodiment 1-1.

Six cathodes and seven anodes are arranged staggerly, the cathodes and the anodes are separated from each other by separators, and thereby a battery, of which theoretical capacity is about 6 Ah, is formed. After the assembly of the battery is completed, the electrolyte solution is injected until saturation.

Comparative Example 1-2

In comparative example 1-2, LMO, graphite KS15 as a conductive agent, SBR and CMC as a binder are mixed in water according to a mass ratio of LMO:CMC:SBR:graphite equal to 84.5:1:2.5:12, so that uniform cathode slurry is formed.

The rest of the composition of the battery and the preparation method are the same as that of comparative example 1-1.

High-Temperature Accelerated Float-Charging Life Experiment

Under room temperature, the battery is charged and discharged with a rate of 0.2C within a voltage range from 1.4V to 2.1V, and the capacity of the battery is calibrated. The battery is then float-charged under 60° C. and 1.95V for 168 hours (one week), and is then discharged with 0.2C to 1.4V. The discharge capacity of the battery is tested. The decrease in the discharge capacity of the battery to 50 percent is adopted as the float-charging life of the battery.

In the high-temperature accelerated float-charging life experiment, a charge and discharge cycle under the ambient temperature of 60° C. in one week equivalent to a normal service life of four months under room temperature.

The test result is shown in table 1-1.

In reference to the battery test results in the embodiments and the comparative examples, it can be seen from table 1-1 that in terms of the capacity exertion of the batteries, the batteries containing 10 percent of graphite as a conductive agent in the cathode which are provided by embodiment 1-1 and comparative example 1-1 show relatively high capacities; and in terms of high-temperature float-charging life, the float-charging life of the battery adopting the graphite foil current collector in the cathode is almost two times the float-charging life of the battery adopting the nickeled carbon steel wrapped by the PE conducting films as the current collector in the cathode. This result indicates that the composite graphite foil cathode current collector can greatly prolong the float-charging life of the aqueous battery.

TABLE 1-1

|  | Capacity (mAh/g) | Float-charging life at 60° C. |
|---|---|---|
| Embodiment 1-1 | 114 | 9 weeks |
| Embodiment 1-2 | 112 | 11 weeks |
| Embodiment 1-3 | 110 | 10 weeks |
| Comparative example 1-1 | 114 | 5 weeks |
| Comparative example 1-2 | 112 | 6 weeks |

Comparative Example 2-1

In comparative example 2-1, the cathode plate and the cathode current collector are not combined by the binding layer, but are simply superposed physically together, and the rest of the composition of the battery and the preparation method are the same as that of embodiment 1-2.

Self-Discharge Test

Under room temperature, the batteries in embodiments 1-1 to 1-3 are first charged and discharged cyclically with the rate of 0.2C within a voltage range from 1.4V to 2.1V, and the capacities of the batteries are calibrated.

The batteries are charged with 0.2C, the fully charged state batteries are placed under 60° C. for 1 day, and are then discharged with 0.2C after being kept still under 25° C. for 2 hours, the remaining capacities of the batteries are tested, and the self-discharge rates of the batteries are calculated. The battery self-discharge rate=(calibrated capacity−remaining capacity)/calibrated capacity.

The batteries are then charged with 0.2C, the fully charged state batteries are placed under 60° C. for 7 days and then, after being kept still under 25° C. for 2 hours, discharged with 0.2C, the remaining capacities of the batteries are tested, and the self-discharge rates of the batteries are calculated.

High-Temperature Accelerated Float-Charging Life Experiment

Under normal temperature, the capacities of the batteries in embodiments 1-1 to 1-3 and comparative example 2-1 are calibrated with 0.2C, and the batteries are then float-charged under 60° C. and 1.95V for 168 hours (one week), and are then discharged with 0.2C to 1.4V. The discharge capacities of the batteries are tested. The decrease in the discharge capacity of the battery to 50 percent is adopted as the float-charging life of the battery.

In the high-temperature accelerated float-charging life experiment, a charge and discharge cycle under the ambient temperature of 60° C. in one week equivalent to a normal service life of four months under room temperature.

The test result is shown in table 2-1.

It can be seen from the result in table 2-1 that in terms of the capacity exertion and high-temperature self-discharge of the batteries, the battery containing 10 percent of graphite as a conductive agent in the cathode which is provided by embodiment 1-1 shows relative better performance, and the next is embodiment 1-2 and embodiment 1-3.

TABLE 2-1

|  | Capacity (mAh/g) | Self-discharge rate (%) (60° C., 1 day) | Self-discharge rate (%) (60° C., 7 days) | Float-charging life (%) (60° C.) |
|---|---|---|---|---|
| Embodiment 1-1 | 114 | 12.5 | 35 | 9 weeks |
| Embodiment 1-2 | 112 | 13.5 | 37 | 11 weeks |
| Embodiment 1-3 | 110 | 15 | 39 | 10 weeks |

In addition, in terms of the 60° C. float-charging lives of the batteries, the float-charging life of the battery provided by embodiment 1-1 is 9 weeks; the float-charging life of the battery provided by embodiment 1-2 is 11 weeks, and specifically, 50.2 percent of the capacity of the battery remains after 11 weeks of float-charging; the float-charging life of the battery provided by embodiment 1-3 is 10 weeks, and specifically, 53 percent of the capacity of the battery remains after 10 weeks of float-charging; and the float-charging life of the battery provided by comparative example 2-1 is only 5 weeks, and the remaining capacity of the battery remains is already less than 50 percent after 5 weeks of float-charging. This experimental result indicates that the high-temperature float-charging life of the battery adopting the nylon net wrapped by the graphite foils as the cathode current collector and containing the binding layer in the cathode is doubled relative to the high-temperature float-charging life of the battery without the binding layer in the cathode, which indicates that the binding layer has a remarkable effect in prolonging the float-charging life of the battery.

Embodiment 2-1

Cathode preparation: Lithium manganese oxide (LMO), graphite KS15 as a conductive agent, styrene-butadiene rubber (SBR) and sodium carboxymethylcellulose (CMC) as a binder are mixed in water according to a weight ratio of LMO:CMC:SBR:graphite equal to 86.5:1:2.5:10, so that a uniform cathode slurry is formed. A nylon net is immersed completely in the cathode slurry, the nylon net stuck with the cathode slurry is then taken out and dried under 60° C., so that an active material layer is formed, the nylon net is then pressed and cut into the size of 8' 10 cm, so that a cathode plate is prepared, the thickness of the cathode plate is 0.4 mm, and the surface density of the cathode active material is 750 g/m$^2$.

The cathode current collector is a nickeled punched carbon steel wrapped by PE conducting films. The nickeled punched carbon steel is placed between the two PE conducting films, the size of the conducting films is slightly greater than that of the cathode current collector, the conducting films and the cathode current collector are combined together by a pneumatic press under 115° C. to 140° C., the pressure is 0.5 MPa, and it should be ensured that the redundant portions of the conducting films relative to the punched carbon steel are fully sealed.

The prepared cathode plate and the cathode current collector with the same size are combined together by a binding layer. Specifically, the binding layer comprises CMC, SBR and graphite KS15, CMC, SBR and KS15 are mixed in water according to the ratio of 1:2.5:96.5 and the coating amount of the binder is 0.5 g/Ah.

The anode comprises two zinc foils with the thickness of 50 μm and a brass foil with the thickness of 20 μm, and the brass foil is placed between the two zinc foils.

The electrolyte solution is a mixed aqueous solution of 2 mol/L $ZnSO_4$ and 1 mol/L $Li_2SO_4$, and the pH of the electrolyte solution is regulated to 5.

The separator is AGM glass fibers, bismuth trioxide is added to the separator, and is specifically added to the side of the separator which faces the anode, and the amount of the added bismuth trioxide is 0.2 g/Ah. The size of the separator and the anode is equal to that of the cathode.

Six cathodes and seven anodes are arranged staggerly, the cathodes and the anodes are separated from each other by separators, and thereby a battery, of which theoretical capacity is about 6 Ah, is formed. After the assembly of the battery is completed, the electrolyte solution is injected until saturation.

Embodiment 2-2

In embodiment 2-2, lithium manganese oxide (LMO), graphite KS15 as a conductive agent, styrene-butadiene rubber (SBR) and sodium carboxymethylcellulose (CMC) as a binder are mixed in water according to a mass ratio of LMO:CMC:SBR:graphite equal to 84.5:1:2.5:12, so that uniform cathode slurry is formed. The rest of the composition of the cathode plate and the preparation method are the same as that of embodiment 2-1.

The rest of the composition of the battery and the preparation method are the same as that of embodiment 2-1.

Comparative Example 2-2

In comparative example 2-2, the cathode plate and the cathode current collector are not combined by the binding layer, but are simply superposed physically together, and the rest of the composition of the battery and the preparation method are the same as that of embodiment 2-2.

Self-Discharge Test

Under room temperature, the batteries in embodiments 2-1 and 2-2 are first charged and discharged cyclically with the rate of 0.2C within a voltage range from 1.4V to 2.1V, and the capacities of the batteries are calibrated.

The batteries are charged with 0.2C, the batteries with the fully charged state are placed under 25° C. for 28 days, then discharged with 0.2C. The remaining capacities of the batteries are tested, and the self-discharge rates of the batteries are calculated.

The batteries are then charged with 0.2C, the batteries with the fully charged state are placed under 60° C. for one day and then, after being kept still under 25° C. for 2 hours, discharged with 0.2C, the remaining capacities of the batteries are tested, and the self-discharge rates of the batteries are calculated.

High-Temperature Accelerated Float-Charging Life Experiment

Under normal temperature, the capacities of the batteries in embodiments 2-1 and 2-2 and comparative example 2-2 are calibrated with 0.2C, and the batteries are then float-charged under 60° C. and 1.95V for 168 hours (one week), and are then discharged with 0.2C to 1.4V. The discharge capacities of the batteries are tested. The decrease in the discharge capacities of the batteries to 50 percent of the calibrated capacities is adopted as the float-charging lives of the batteries.

In the high-temperature accelerated float-charging life experiment, a charge and discharge cycle under the ambient temperature of 60° C. within one week equivalent to a normal service life of four months under room temperature.

The test result is shown in table 2-2.

TABLE 2-2

| | Self-discharge rate (%) 25° C., 28 days | Self-discharge rate (%) 60° C., 1 day | Float-charging life (%) (60° C.) |
|---|---|---|---|
| Embodiment 2-1 | 13 | 12 | 5 weeks |
| Embodiment 2-2 | 14 | 13 | 6 weeks |

It can be seen from the result in table 2-2 that in terms of the high-temperature self-discharge of the batteries, the battery containing 10 percent of graphite as a conductive agent in the cathode which is provided by embodiment 2-1 is slightly better than the battery provided by embodiment 2-2.

In addition, in terms of the 60° C. float-charging lives of the batteries, the float-charging life of the battery provided by embodiment 2-1 is 5 weeks; the float-charging life of the battery provided by embodiment 2-2 is 6 weeks; the float-charging life of the battery provided by comparative example 2-2 is only 4 weeks, and the remaining capacity of the battery is already less than 50 percent after 4 weeks of float-charging. This experimental result indicates that the high-temperature float-charging life of the battery adopting the nickeled punched carbon steel wrapped by the PE conducting films as the cathode current collector and containing the binding layer in the cathode is prolonged by 25 to 50 percent relative to the high-temperature float-charging life of the battery without the binding layer in the cathode, which indicates that the binding layer has a remarkable effect in prolonging the float-charging life of the battery.

In reference to the test results of the batteries in embodiments 1-1 to 1-3, 2-1 and 2-2, it can be seen that in terms of self-discharge, the battery performance of the battery adopting the graphite foil current collector in the cathode is equivalent to that of the battery adopting the nickeled carbon steel wrapped by the PE conducting films as the current collector in the cathode, but, in terms of high-temperature float-charging life, the float-charging life of the battery adopting the graphite foil current collector in the cathode is almost two times the float-charging life of the battery adopting the nickeled carbon steel wrapped by the PE conducting films as the current collector in the cathode. This result indicates that the graphite foil cathode current collector can prolong the float-charging life of the aqueous battery.

Embodiment 3-1

The cathode active material $LiMn_2O_4$ of MTI Corporation is adopted. Multi-walled carbon nanotubes (CNT) are prepared by adopting the chemical vapor deposition (CVD) method, the length can be up to 100 μm, and the diameter is about 1 nm. However, in order to prepare pure CNTs, 18 percent HCl solution and 20 percent HF solution are used to remove catalyst impurity attached to the CNTs, and deionized water is then used to wash the CNTs, and the CNTs are then dried.

The active material $LiMn_2O_4$, a composite conductive agent (written as CNT/AB, wherein the mass ratio of the CNTs and AB is 0.5) containing the carbon nanotubes and the acetylene black and polyvinylidene fluoride (PVDF) are mixed in NMP according to a mass ratio of 83:10:7, so that a uniform cathode slurry is formed, wherein the cathode material is written as $CNT/AB/LiMn_2O_4$, and the mass ratio of the CNT/AB to $LiMn_2O_4$ is 0.12. The cathode slurry is coated on graphite foils of a current collector, and is air-dried under 60° C. for 24 hours. The above-mentioned prepared cathode is cut into a round cathode plate which is 12 mm in diameter, the amount of the loaded active material is 1.5 mg cm$^{-2}$, and the cathode plate is soaked in electrolyte solution under low voltage. The anode adopts a round zinc plate with a diameter of 12 mm as a current collector. A separator adopts AGM glass fibers.

The electrolyte solution is an aqueous solution containing 2 mol/L $Li_2SO_4$ and 1 mol/L $ZnSO_4$, and 0.1 mol/L LiOH is used to titrate its pH which is 4.

The above-mentioned prepared cathode plates, anode plates, electrolyte solution and separators are assembled into a double-electrode Swagelok battery.

Embodiment 3-2

The difference from embodiment 3-1 is that the mass ratio of composite conductive agent CNT/AB to $LiMn_2O_4$ of a cathode material is 0.2, and the other part is the same as that of embodiment 3-1, and a battery is assembled.

Embodiment 3-3

The difference from embodiment 3-1 is that the mass ratio of CNTs to AB in a composite conductive agent of a cathode material is 0.33, and the other part is the same as that of embodiment 3-1, and a battery is assembled.

Comparative Example 3-1

The difference from embodiment 3-1 is that a conductive agent of a cathode material adopts acetylene black (AB), the cathode material is written as AB/LiMn$_2$O$_4$, the other part is the same as that of embodiment 3-1, and a battery is assembled.

Comparative Example 3-2

The difference from embodiment 3-1 is that a conductive agent of a cathode material adopts carbon nanotubes (CNT), the cathode material is written as CNT/LiMn$_2$O$_4$, the other part is the same as that of embodiment 3-1, and a battery is assembled.

Comparative Example 3-3

The difference from embodiment 3-1 is that the mass ratio of composite conductive agent CNT/AB to LiMn$_2$O$_4$ of a cathode material is 0.05, and the other part is the same as that of embodiment 3-1, and a battery is assembled.

Comparative Example 3-4

The difference from embodiment 3-1 is that the mass ratio of composite conductive agent CNT/AB to LiMn$_2$O$_4$ of a cathode material is 0.4, and the other part is the same as that of embodiment 3-1, and a battery is assembled.

Comparative Example 3-5

The difference from embodiment 3-1 is that the mass ratio of CNTs to AB in a composite conductive agent of a cathode material is 0.2, and the other part is the same as that of embodiment 3-1, and a battery is assembled.

Comparative Example 3-6

The difference from embodiment 3-1 is that the mass ratio of CNTs to AB in a composite conductive agent of a cathode material is 1.5, and the other part is the same as that of embodiment 3-1, and a battery is assembled.

Material Property Test

An X-ray diffraction (XRD) pattern is adopted to observe the crystal structure of the cathode material provided by embodiment 3-1, and a scanning electron microscope (SEM) and a transmission electron microscope (TEM) are adopted to observe microtopography and size.

Electrochemical Property Test

Electrochemical property tests are respectively carried out on the batteries provided by embodiment 3-1, comparative example 3-1 and comparative example 3-2, different rates (1C=120 mA g$^{-1}$) are adopted to carry out charge and discharge tests on the batteries under room temperature by the way of constant current, and the testing voltage range is 1.4-2.1V vs. Zn$^{2+}$/Zn. Cyclic voltammetric tests are carried out on the batteries under a scanning rate of 0.1 mV s$^{-1}$, and the alternating-current impedances of the batteries are measured.

Figure 2:
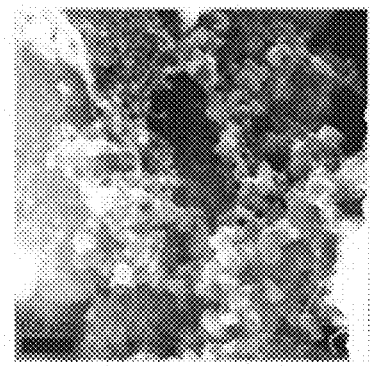
FIG. 2 is an SEM (Scanning Electron Microscope) diagram of the cathode material provided by embodiment 3-1.
Figure 3:
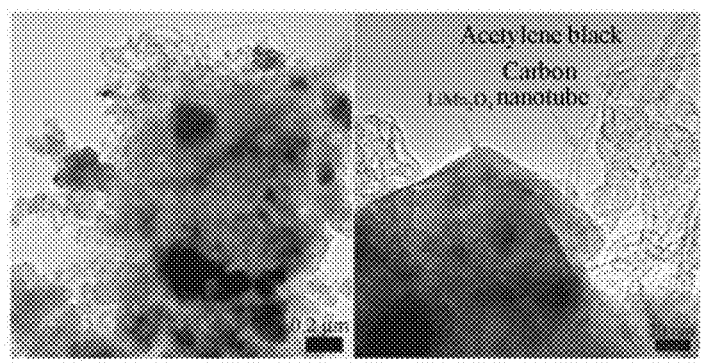
FIG. 3 is TEM (Transmission Electron Microscope) diagrams of the cathode material provided by embodiment 3-1, the left diagram is a TEM diagram observed under low resolution, and the right diagram is a TEM diagram observed under high resolution.

FIG. 2 is an SEM diagram of the cathode material provided by embodiment 3-1 before cycling, and FIG. 3 is a TEM diagram of the material. Known from the drawings, the LiMn$_2$O$_4$ particles are distributed uniformly, the CNTs and the AB are formed into a three-dimensional conductive network, and the CNTs are connected between the AB and the LiMn$_2$O$_4$ particles in an interleaving manner, which can help to enlarge the interface contact area between the particles. Such a special netty structure can increase the conductive contact between LiMn$_2$O$_4$ particles and between the LiMn$_2$O$_4$ particles and the conductive particles, and thereby can help to increase the electrochemical properties of the battery.

Figure 4:
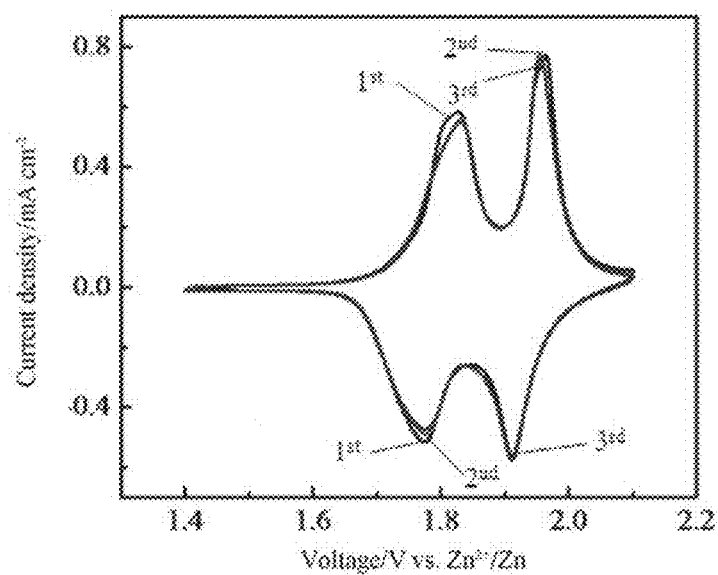
FIG. 4 is a cyclic voltammetry curve of a battery provided by embodiment 3-1.

FIG. 4 is a cyclic voltammetric (CV) curve of the battery provided by embodiment 3-1. It can be seen from the drawing that the two pairs of reduction and oxidation peaks on the CV curve are respectively at 1.82/1.78V and 1.96/1.92V under the scanning rate of 0.1 mV s$^{-1}$. This result is consistent with the deintercalation or intercalation of Li$^+$ of the cathode material with the spinel structure in the aqueous battery. The potential difference between the oxidation peak and the reduction peak is caused by electrode polarization in the cycling process, polarization makes the voltage of the oxidation peak move toward a positive potential and the voltage of the reduction peak to move toward a negative potential, however, the potential difference between the oxidation peak and the reduction peak is only 0.04V, and therefore it can be considered that the deintercalation and intercalation of Li are reversible. Moreover, the peak shapes of the oxidation and reduction peaks are almost superposed in three times of cycling processes, this also proves that the network structure of the composite conductive agent CNT/AB is very stable in the system, the CNT/AB has not only good electrical conductivity but also good oxidation resistance, and all these help LiMn$_2$O$_4$ to exert excellent cycling performance and rate capability.

Figure 5:
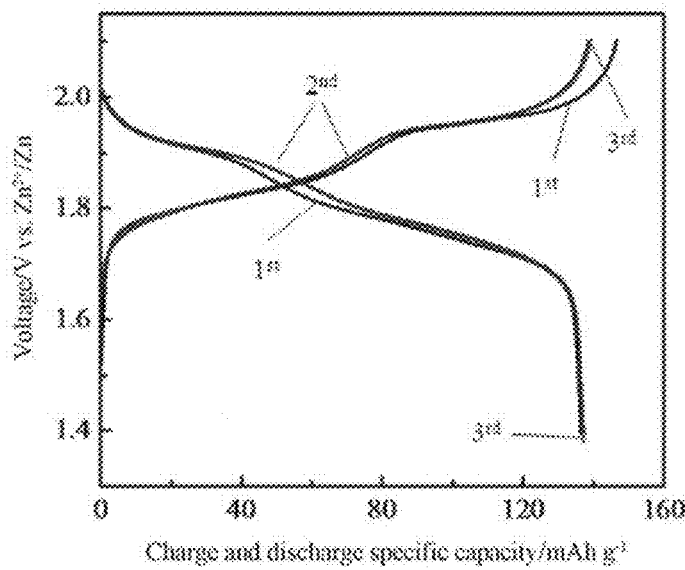
FIG. 5 is charge and discharge curves of the battery provided by embodiment 3-1 under a rate of 4C in three previous cycles.

FIG. 5 is first-time, second-time and third-time charge and discharge curves of the battery provided by embodiment 3-1 under a rate of 4C. Each curve has two very obvious voltage plateaus, which indicates that the deintercalation and intercalation of Li$^+$ in LiMn$_2$O$_4$ is a two-phase process, and this is consistent with the result of the above-mentioned CV curve. The initial charge and discharge specific capacity of the battery is respectively 146 mAh g$^{-1}$ and 139 mAh g$^{-1}$, the initial coulombic efficiency is 95.2 percent, which is much higher than the initial coulombic efficiency of organic lithium ion secondary batteries, and this is because an SEI (Solid Electrolyte Interphase) film cannot be formed in the aqueous battery. In addition, the high discharge specific capacity of the battery also indicates that the battery is provided with a three-dimensional long conductive path on the basis of the CNTs and the AB, forming a mutually cross-connected network structure, and thereby LiMn$_2$O$_4$ can better exert its properties.

Figure 6:
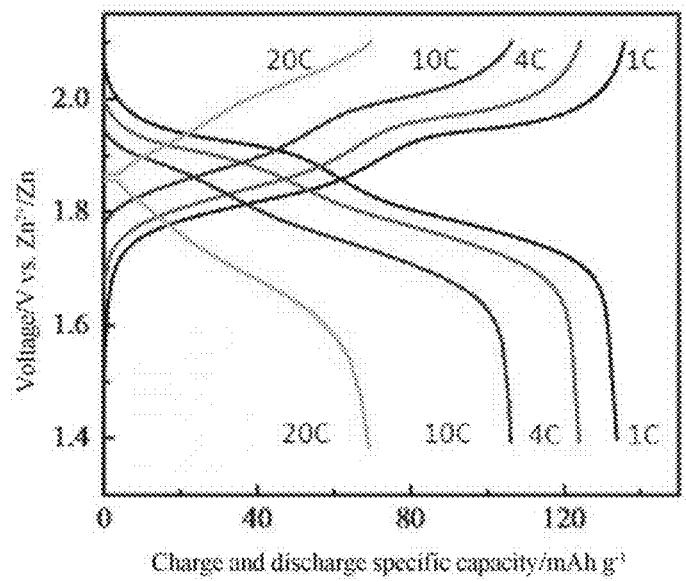
FIG. 6 is charge and discharge curves of the battery provided by embodiment 3-1 under different rates.

FIG. 6 is charge and discharge curves of the battery provided by embodiment 3-1 under different rates (1C, 4C, 10C and 20C). Known from the drawing, the charge and discharge voltage plateaus of the battery of embodiment 3-1 respectively appear nearby 1.95V and 1.80V, moreover, as the rate increases, although the polarization of the charge and discharge curve is becoming greater, the polarization is not very severe, and under the rate of 20C, the battery still has about 70 mAh g$^{-1}$ of discharge specific capacity. The above-mentioned result indicates that the cathode material with the composite conductive agent shows excellent reversibility, and this is also consistent with the result of the CV curve.

Figure 7:
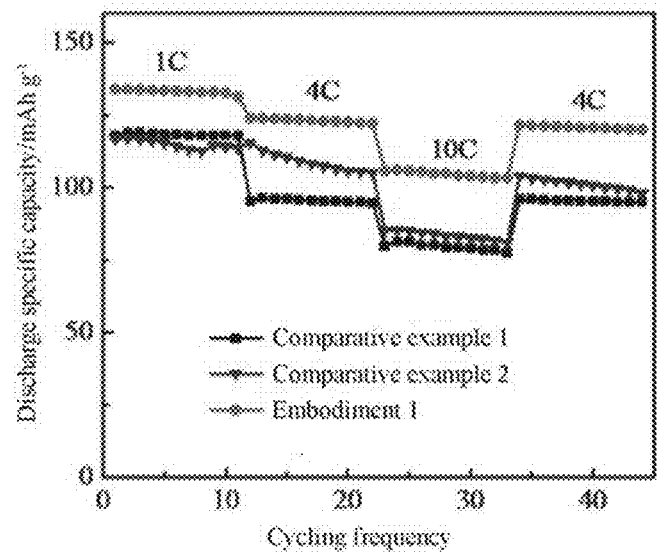
FIG. 7 is a cycling performance diagram of batteries provided by embodiment 3-1, comparative example 3-1 and comparative example 3-2 under different rates.

FIG. 7 is a cycling performance diagram of the batteries provided by embodiment 3-1, comparative example 3-1 and comparative example 3-2 under different rates. It can be seen from the drawing that no matter whether it is under a high rate or a low rate, the discharge specific capacity of the battery with the composite conductive agent CNT/AB is higher than the specific capacity of the battery with the single conductive agent AB or CNT. When it is under the rate of 10C, the discharge specific capacity of the battery of embodiment 3-1 can still reach 105 mAh g$^{-1}$, and even though the battery carries out charge-discharge cycling under 4C again after being cycled 30 times under 1C, 4C and 10C, the specific capacity can still reach the previous capacity under the rate of 4C, that is, the capacity retention rate is about 100 percent.

Figure 8:
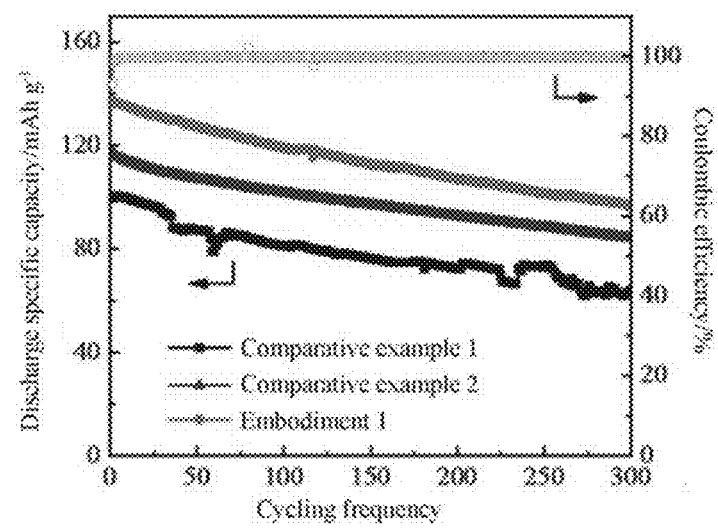
FIG. 8 is a cycling performance diagram of the batteries provided by embodiment 3-1, comparative example 3-1 and comparative example 3-2 under the rate of 4C.

FIG. 8 is a cycling performance diagram of the batteries provided by embodiment 3-1, comparative example 3-1 and comparative example 3-2 under the rate of 4C. After 300 times of cycling, the battery provided by embodiment 3-1 still has 92 mAh $g^{-1}$ of discharge specific capacity, which is higher than the discharge specific capacity (64 mAh $g^{-1}$ or 84 mAh $g^{-1}$) of the battery provided by comparative example 3-1 or comparative example 3-2, and the coulombic efficiency of the battery is kept stable in the cycling process, almost reaching 100 percent. These results indicate that the battery adopting the composite conductive agent has excellent cycling stability and reversibility, proving that the structure which is formed after CNT and AB combination is much more stable than the single CNTs or AB and that the electrical conductivity is good as well. The single conductive agent CNT or AB can be easily oxidized and corroded in the process of charge and discharge, and can also easily agglomerate under high current density.

Figure 9:
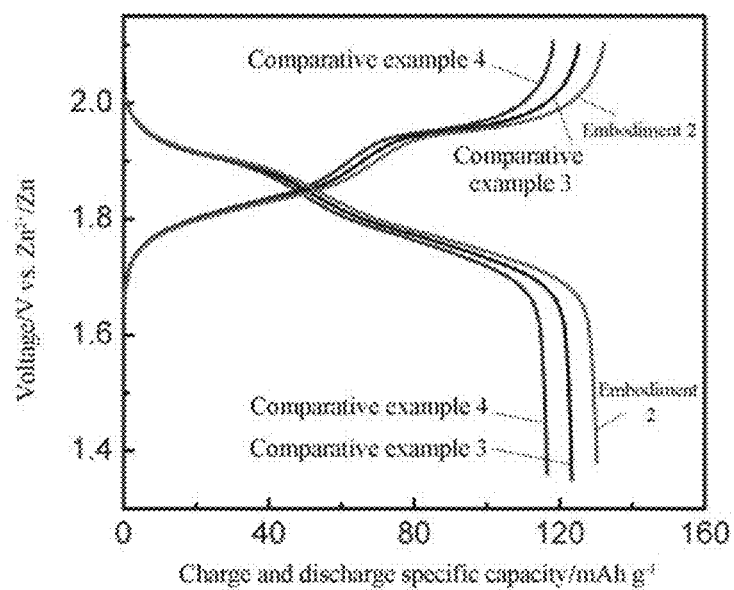
FIG. 9 is charge and discharge curves of batteries provided by embodiment 3-2, comparative example 3-3 and comparative example 3-4 under the rate of 4C.
Figure 10:
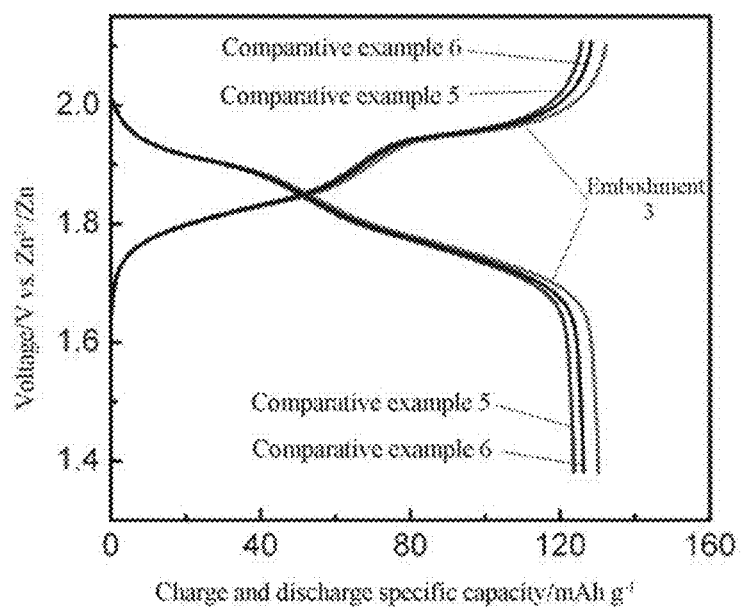
FIG. 10 is charge and discharge curves of batteries provided by embodiment 3-3, comparative example 3-5 and comparative example 3-6 under a rate of 1C.

FIG. 9 is charge and discharge curves of the batteries provided by embodiment 3-2, comparative example 3-3 and comparative example 3-4 under a rate of 4C. Known from the drawing, the specific capacity of the battery provided by embodiment 3-2 is significantly higher than that of the batteries of comparative example 3-3 and comparative example 3-4, and the polarization of the battery of embodiment 3-2 is the least. It indicates that when the ratio of the composite conductive agent CNT/AB to the cathode active material in the cathode material is different, the properties of the cathode material will also be different, and too much or too little content of the composite conductive agent CNT/AB cannot make the cathode material show excellent properties. FIG. 10 is charge and discharge curves of the batteries provided by embodiment 3-3, comparative example 3-5 and comparative example 3-6 under a rate of 1C. Known from the drawing, the specific capacity of the battery provided by embodiment 3-3 is significantly higher than that of the batteries of comparative example 3-5 and comparative example 3-6, and the polarization of the battery of embodiment 3-3 is the least. Similar to the result of FIG. 9, when the ratio of the CNTs to the AB in the composite conductive agent of the cathode material is different, the properties of the cathode material will also be different, and too high or too low mass ratio of the CNTs to the AB in the composite conductive agent cannot make the cathode material show excellent properties.

The above-mentioned result indicates that after the conductive agents CNT and AB are compounded, both the conductive effect and the oxidation resistance are enhanced greatly in comparison with that of the single conductive agent CNT or AB, but not any proportions of compounding can make the cathode active material exert excellent properties. Only when the amounts of the CNTs, the AB and $LiMn_2O_4$ are controlled within certain proportion ranges can the composite conductive agent CNT/AB have excellent electrical conductivity and oxidation resistance, and thereby it can be ensured that the cathode active material $LiMn_2O_4$ will exert excellent rate capability and cycling performance. This is because only by controlling the proportions of the three can the CNTs and the AB be formed into the effectively cross-connected, mutually tightly surrounded and combined network structure, and the $LiMn_2O_4$ particles can also be uniformly distributed and arranged in the network, so that the network not only has a strong and stable structure and cannot be easily oxidized, but also can effectively increase the ion and electron conductivity of the cathode active material.

Figure 11:
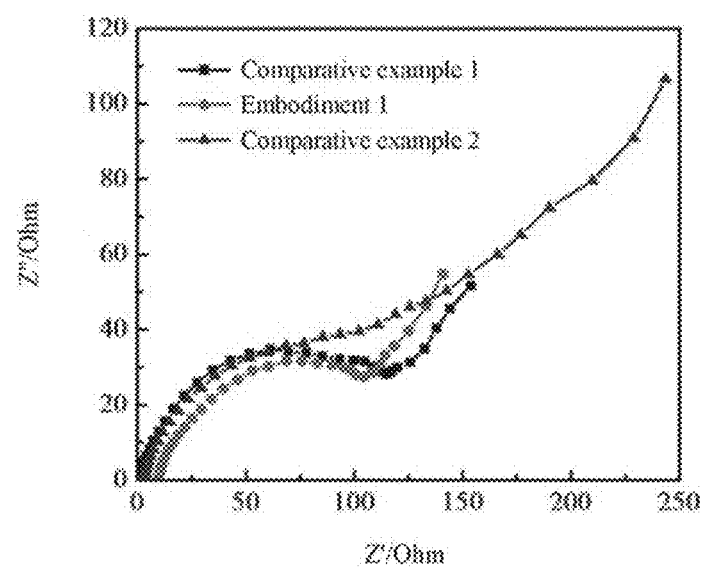
FIG. 11 is an AC impedance pattern of the batteries provided by embodiment 3-1, comparative example 3-1 and comparative example 3-2 after 300 times of cycling under the rate of 4C.

FIG. 11 is an alternating-current impedance pattern of the batteries provided by embodiment 3-1, comparative example 3-1 and comparative example 3-2 after 300 times of cycling under the rate of 4C. It can be seen from the drawing that the alternating-current impedance pattern is composed of two semicircles at medium and high frequencies and a straight line at low frequency. The difference from the alternating-current impedance pattern of an organic lithium ion battery is that the semicircle of the aqueous lithium ion battery at the high frequency represents contact impedance rather than SEI film impedance. Both semicircles on the battery impedance pattern of embodiment 3-1 are smaller than the semicircles of comparative example 3-1 and comparative example 3-2, this indicates that both the contact impedance and charge transfer impedance of $LiMn_2O_4$ are reduced after the conductive agents CNT and AB are compounded, this also proves that the CNT/AB three-dimensional conductive network structure can accelerate the transfer speed of electrons and ions, and thereby the properties of $LiMn_2O_4$ are enhanced.

Figure 12:
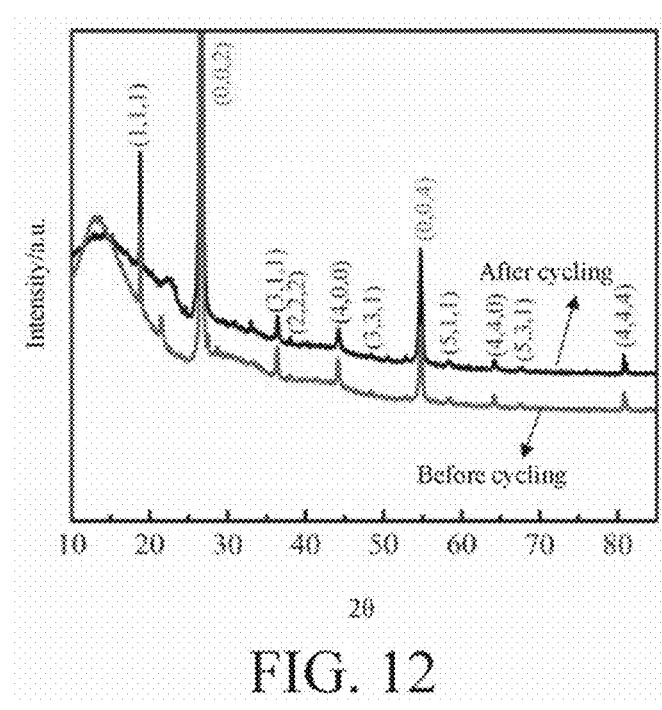
FIG. 12 is an XRD (X-Ray Diffraction) diagram of the cathode material provided by embodiment 3-1 before charge-discharge cycling and after 300 cycles under the rate of 4C.

FIG. 12 is an XRD diagram of the cathode material $CNT/AB/LiMn_2O_4$ provided by embodiment 3-1 before charge-discharge cycling and after 300 times of cycling under the rate of 4C. The curve after 300 times of charge-discharge cycling and the curve before charge and discharge are identical, which indicates that the structure of the $LiMn_2O_4$ material with the composite conductive agent is stable and that its long cycling life is good.

We claim:
1. A battery, comprising:
a cathode, an anode and an electrolyte;
the cathode comprising a cathode current collector and a cathode material, and the cathode material comprising a cathode active material which is capable of reversibly intercalating and deintercalating a plurality of first metal ions;
the electrolyte comprising a solvent capable of dissolving the first metal ions and a plurality of second metal ions that can be reduced to a metal during a charge cycle and be oxidized from the metal to the dissolved second metal ions during a discharge cycle, with the first metal ions being different from the second metal ions;
the cathode current collector comprising an electrochemically inert carrier and graphite foil, the carrier being wrapped by the graphite foil,
wherein the material of the carrier is selected from one of polyethylene terephthalate, polybutylene terephthalate, polyethylene, polypropylene, polyamide, polyurethane and polyacrylonitrile,
wherein the carrier is provided with a porous structure and the pore size range of the carrier is between 50 meshes and 200 meshes, and
wherein the thickness of the carrier is less than 1 mm.
2. The battery according to claim 1, wherein the thickness range of the graphite foil is between 0.1 mm and 0.2 mm.
3. The battery according to claim 1, wherein the content of carbon in the graphite foil is greater than 97 percent.
4. The battery according to claim 1, wherein the battery further comprises a bismuth compound as an additive, the bismuth compound is added in the anode and/or the electrolyte.

5. The battery according to claim 4, wherein the bismuth compound is selected from bismuth trioxide and bismuth nitrate.

6. The battery according to claim 1, wherein the anode comprises a brass foil and a zinc foil.

7. The battery according to claim 1, wherein the cathode material further comprises a cathode conductive agent, the cathode conductive agent accounts for 1 to 15 percent by mass of the cathode material.

8. The battery according to claim 1, wherein the cathode comprises a cathode plate and a binding layer which is arranged between the cathode plate and the cathode current collector, the cathode plate comprises the cathode active material, and the binding layer comprises a binder and a conductive agent.

9. The battery according to claim 8, wherein the weight range of the binding layer per ampere hour is between 0.5 g and 1 g.

10. The battery according to claim 8, wherein the weight proportion range of the binder in the binding layer is between 1 percent and 70 percent, and the weight proportion range of the conductive agent in the binding layer is between 30 percent and 99 percent.

11. The battery according to claim 8, wherein the material of the binder is selected from polytetrafluoroethylene, polyvinylidene fluoride, acrylonitrile multipolymer, hydroxypropyl methyl cellulose, polyethylene oxide, polyacrylamide or a mixture of sodium carboxymethylcellulose and styrene-butadiene rubber.

12. The battery according to claim 8, wherein the material of the conductive agent is selected from at least one of graphite, carbon nanotubes, graphene, carbon blacks and carbon fibers.

13. A battery pack, comprising a plurality of the batteries according to claim 1.

14. An uninterrupted power supply, comprising the battery according to claim 1.

15. The battery according to claim 1, wherein the first metal ions are selected from the group consisting of lithium ions, sodium ions, and magnesium ions, and the second metal ions are selected from the group consisting of manganese ions, iron ions, copper ions, zinc ions, chromium ions, nickel ions, tin ions, and lead ions.

16. The battery according to claim 1, wherein, during the charge cycle, the first metal ions reversibly deintercalate from the cathode.

17. The battery according to claim 1, wherein, during the discharge cycle, the first metal ions reversibly intercalate into the cathode.

18. The battery according to claim 1, wherein the graphite foil has a density of greater than 1 g/cm$^3$.

* * * * *